Oct. 3, 1939.    A. T. KOPPE    2,174,726
PHOTOCOMPOSING MACHINE
Filed Feb. 6, 1936    14 Sheets-Sheet 1

INVENTOR
Alexander T. Koppe
BY
Ward, Crosby & Neal
ATTORNEYS

Oct. 3, 1939.  A. T. KOPPE  2,174,726
PHOTOCOMPOSING MACHINE
Filed Feb. 6, 1936 14 Sheets-Sheet 3

INVENTOR
Alexander T. Koppe
BY
Ward, Crosby & Neal
ATTORNEYS

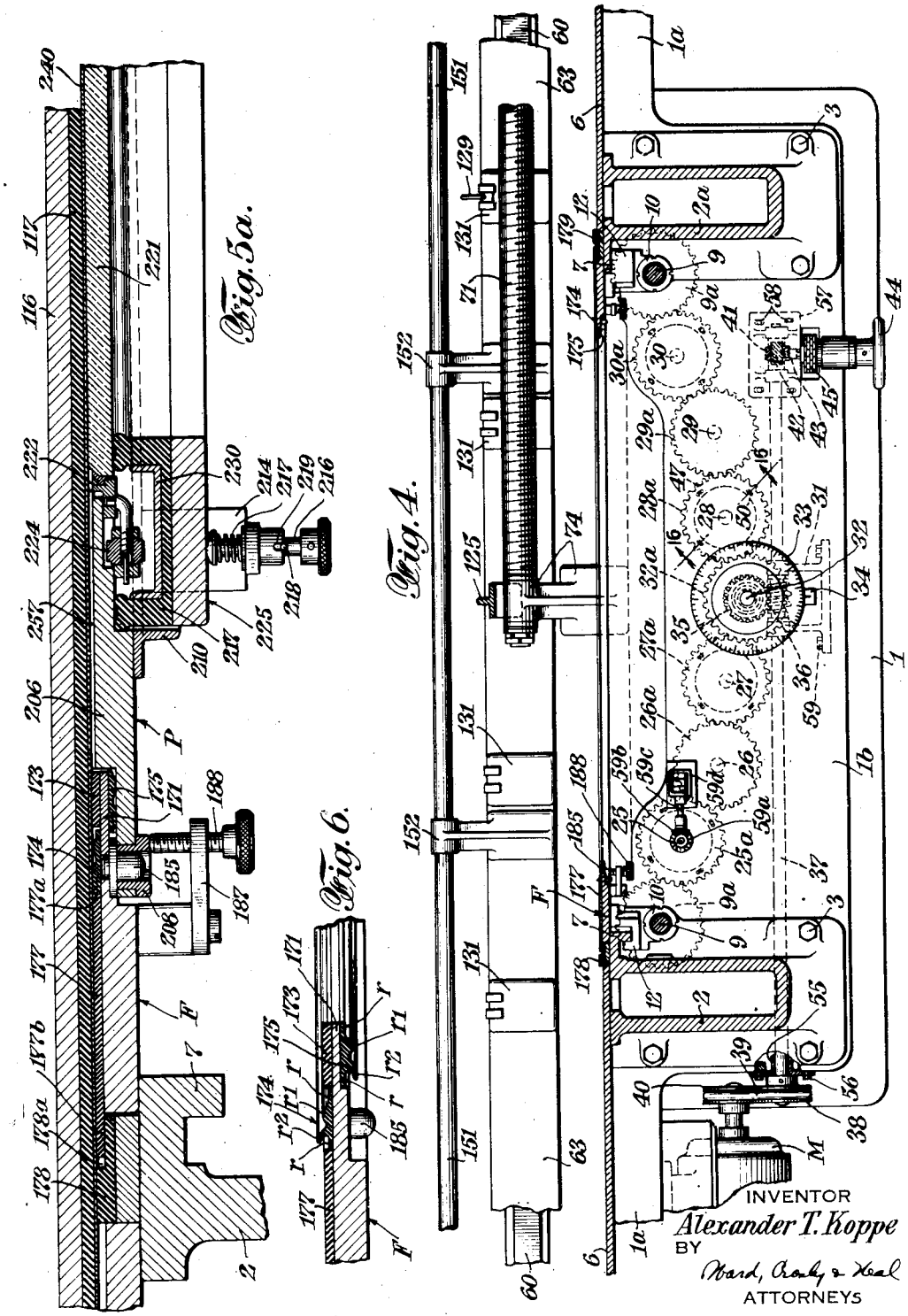

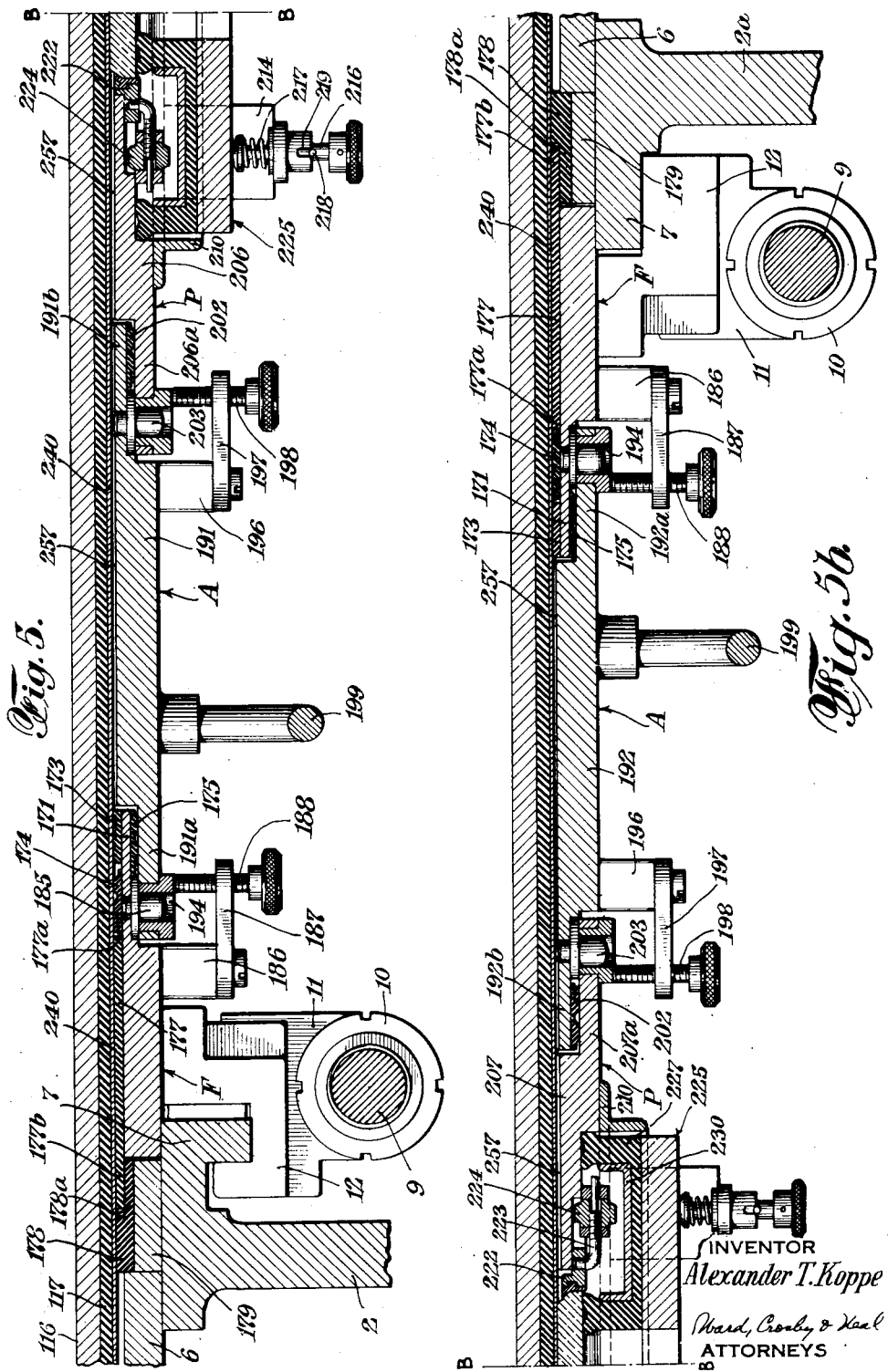

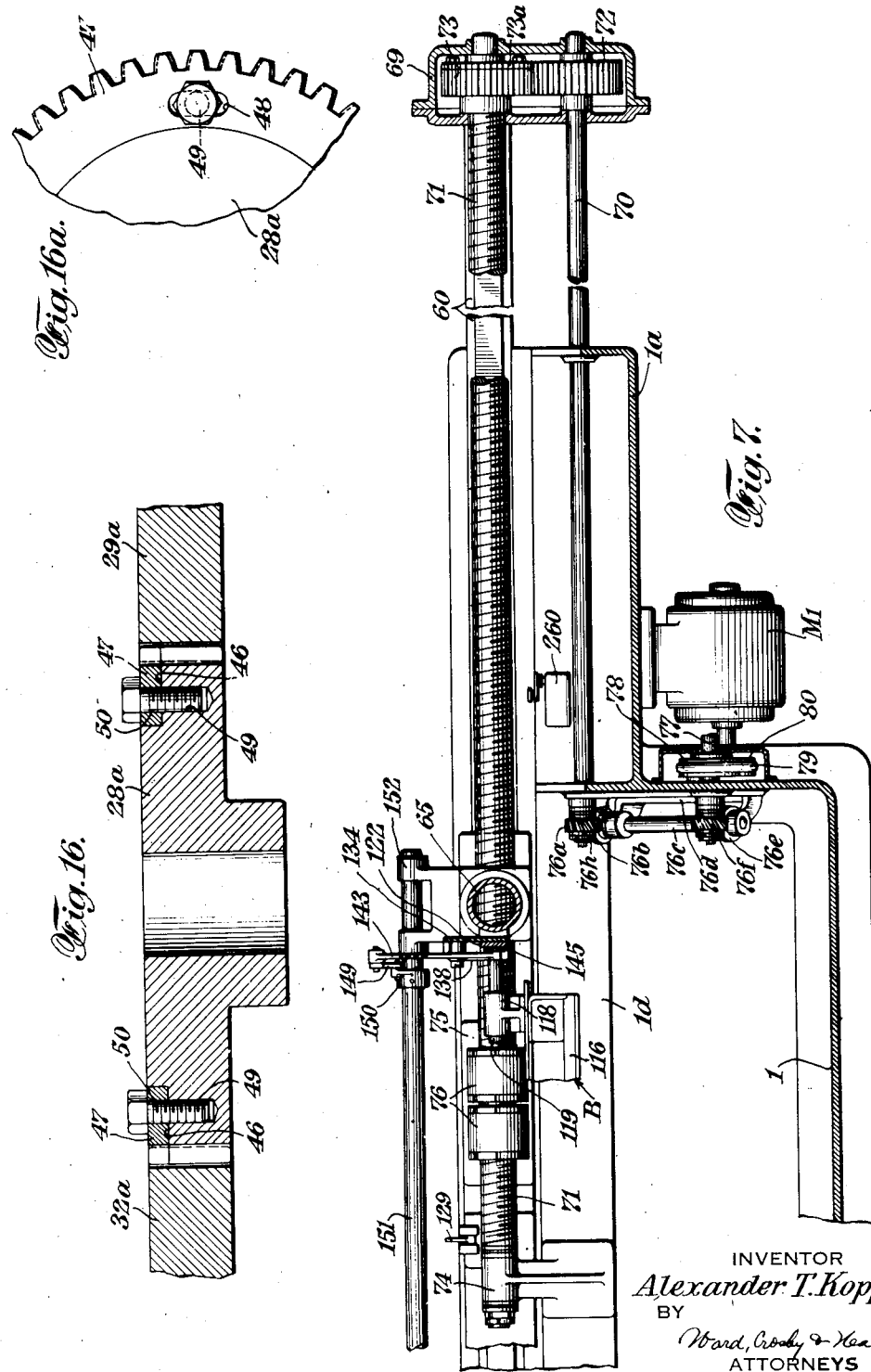

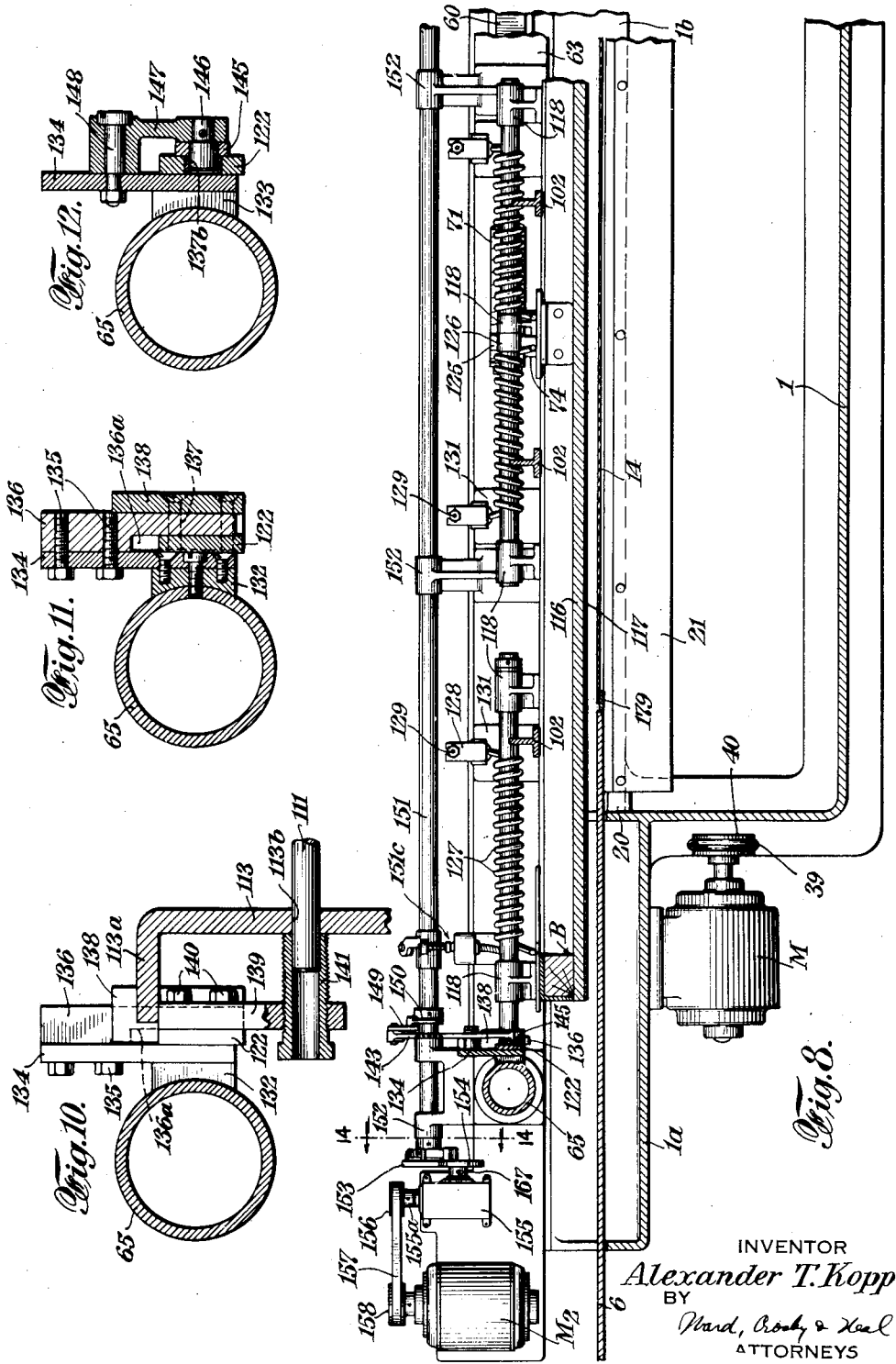

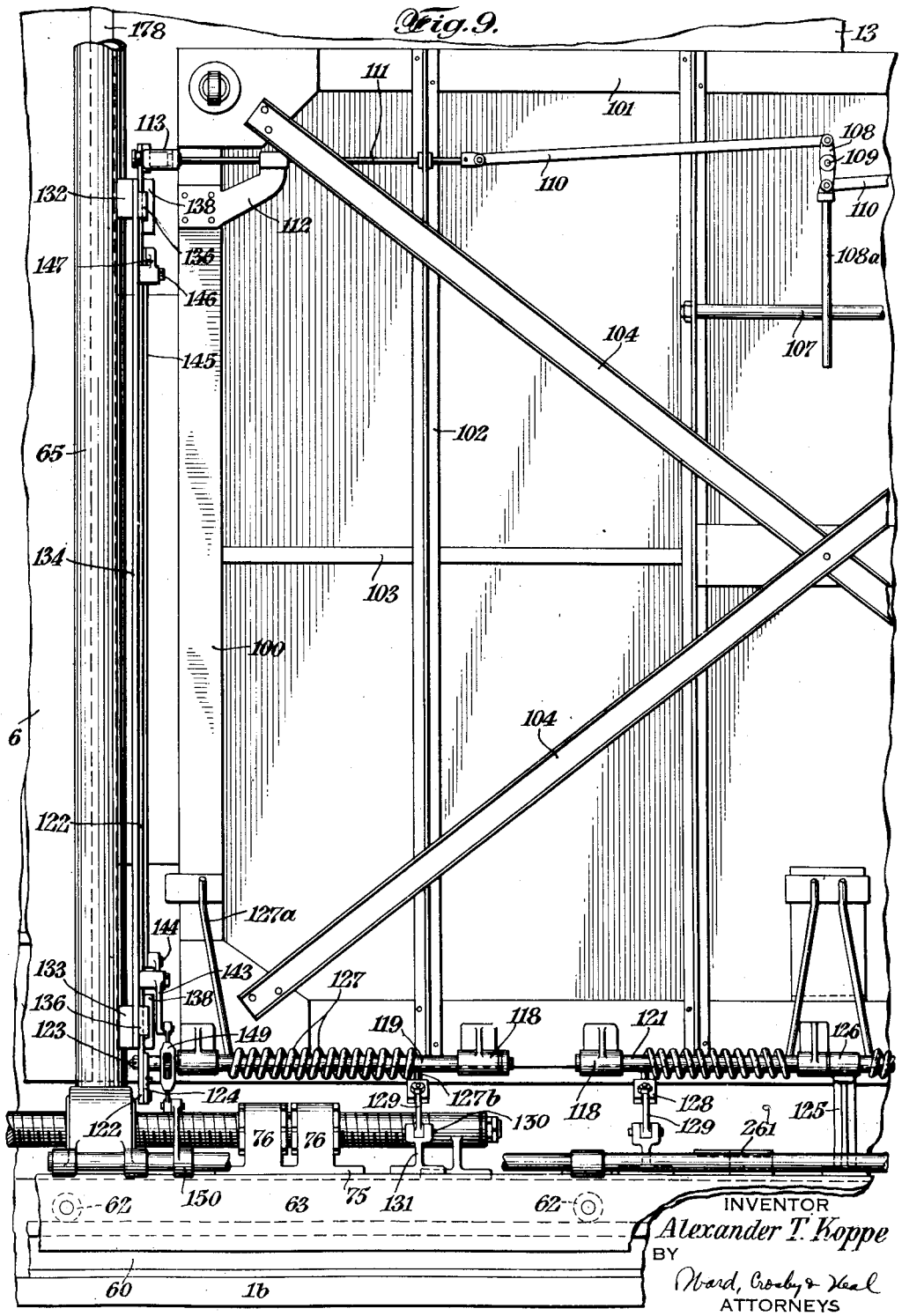

Oct. 3, 1939.  A. T. KOPPE  2,174,726
PHOTOCOMPOSING MACHINE
Filed Feb. 6, 1936  14 Sheets-Sheet 9

INVENTOR
Alexander T. Koppe
BY
Ward, Crosby & Neal
ATTORNEYS

Oct. 3, 1939.  A. T. KOPPE  2,174,726
PHOTOCOMPOSING MACHINE
Filed Feb. 6, 1936   14 Sheets-Sheet 10
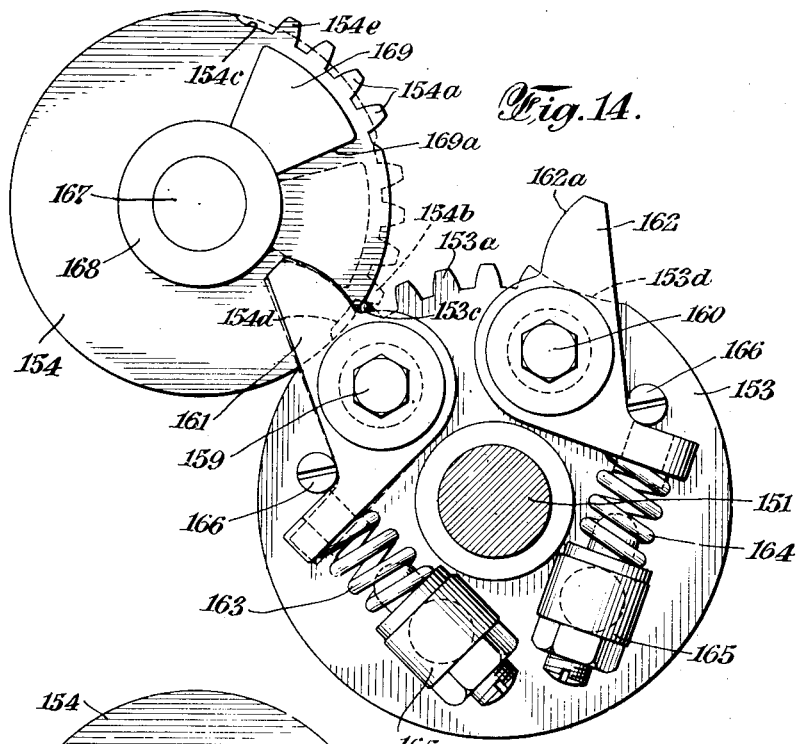
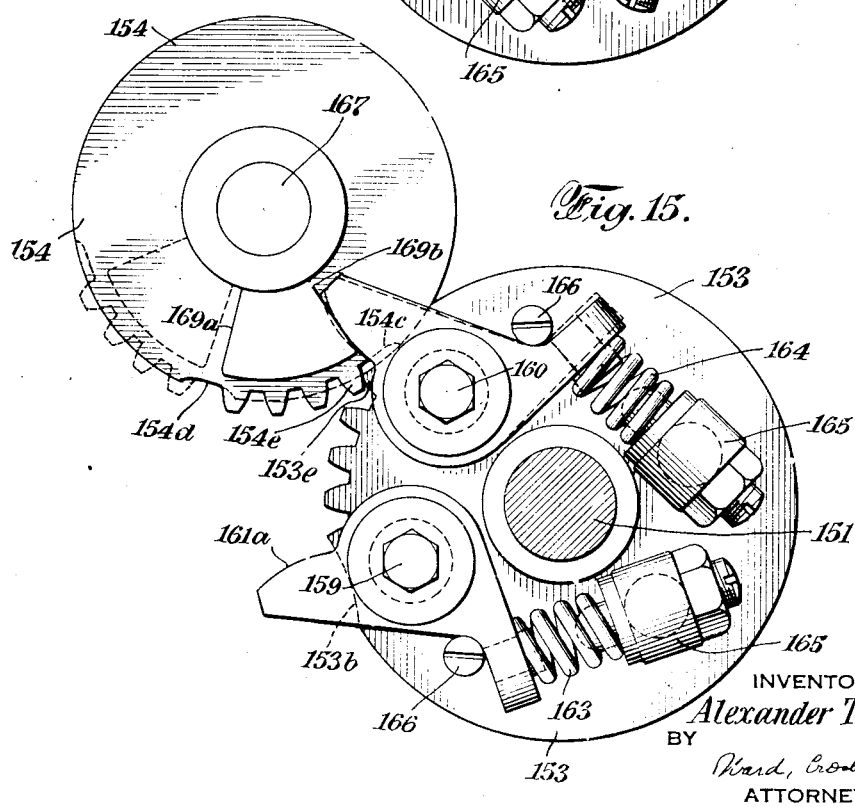
INVENTOR
Alexander T. Koppe
BY
Ward, Crosby & Neal
ATTORNEYS Oct. 3, 1939.　　　　A. T. KOPPE　　　　2,174,726
PHOTOCOMPOSING MACHINE
Filed Feb. 6, 1936　　　　14 Sheets-Sheet 11
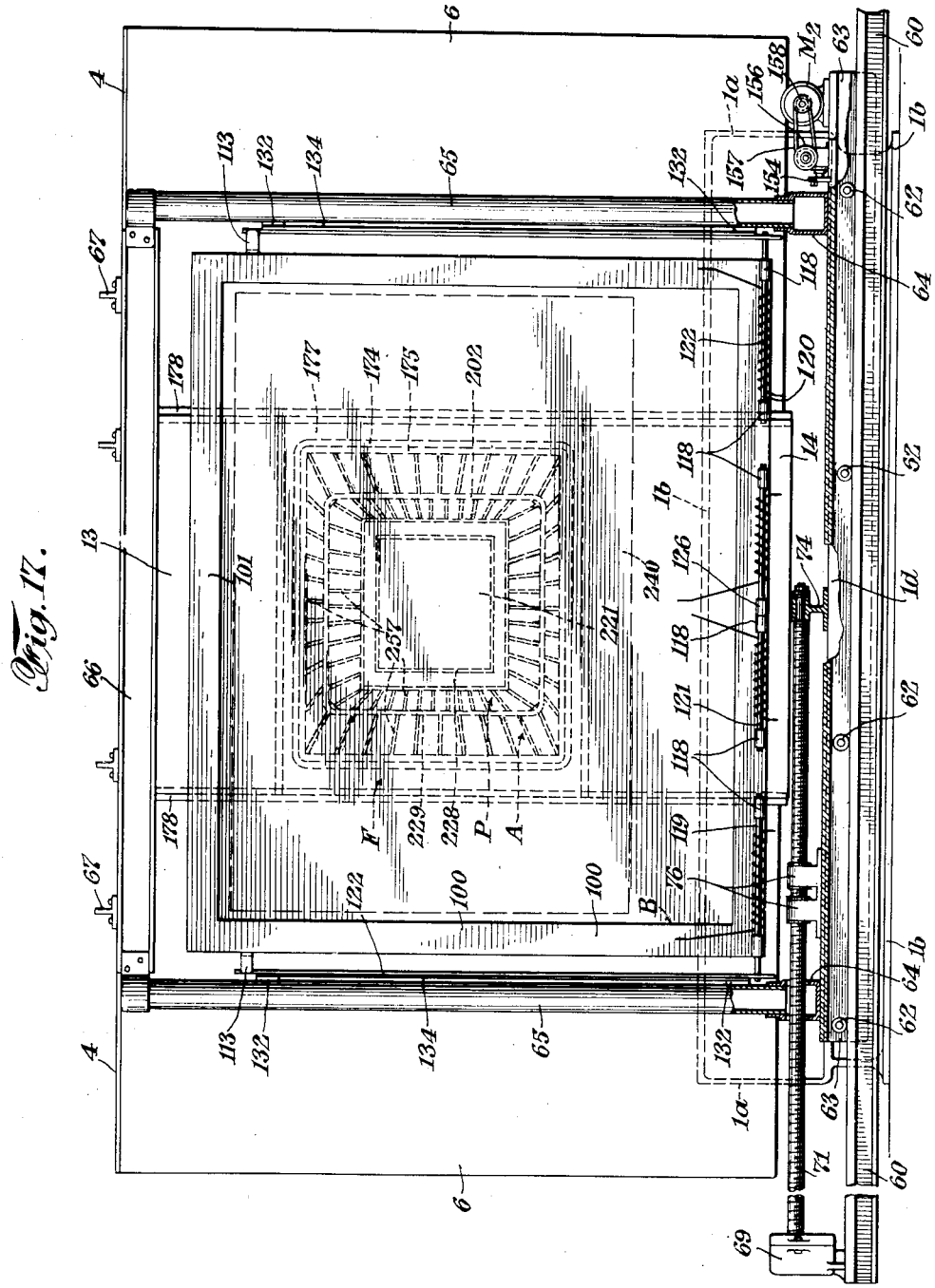
INVENTOR
*Alexander T. Koppe*
BY
*Ward, Crosby & Neal*
ATTORNEYS

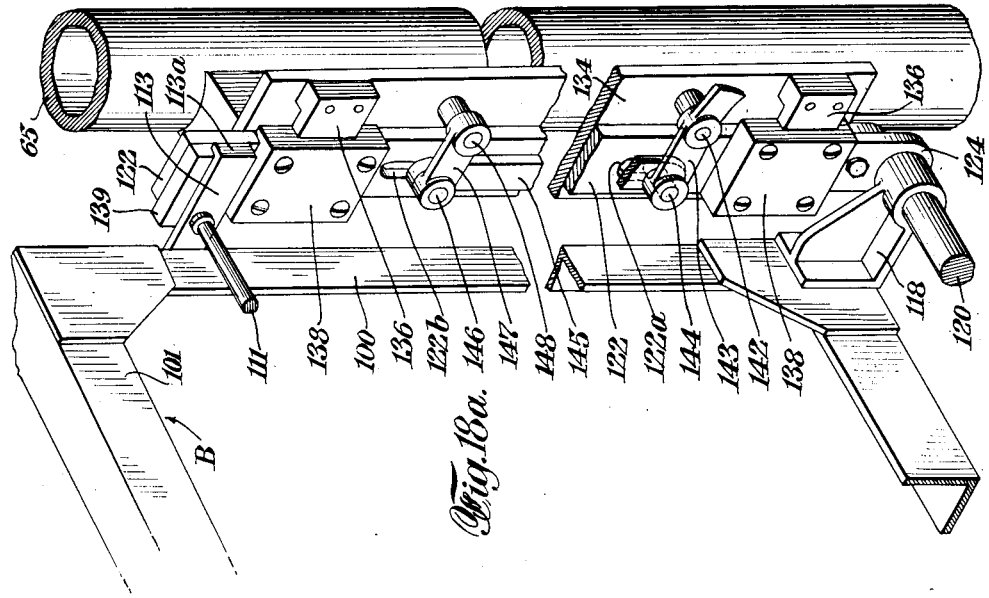
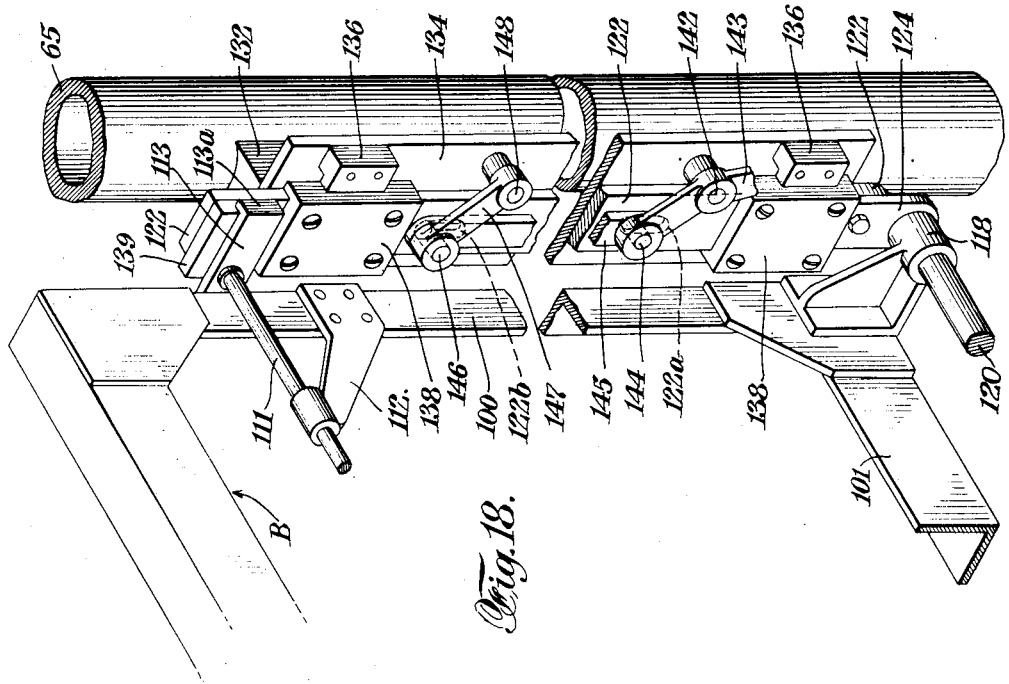

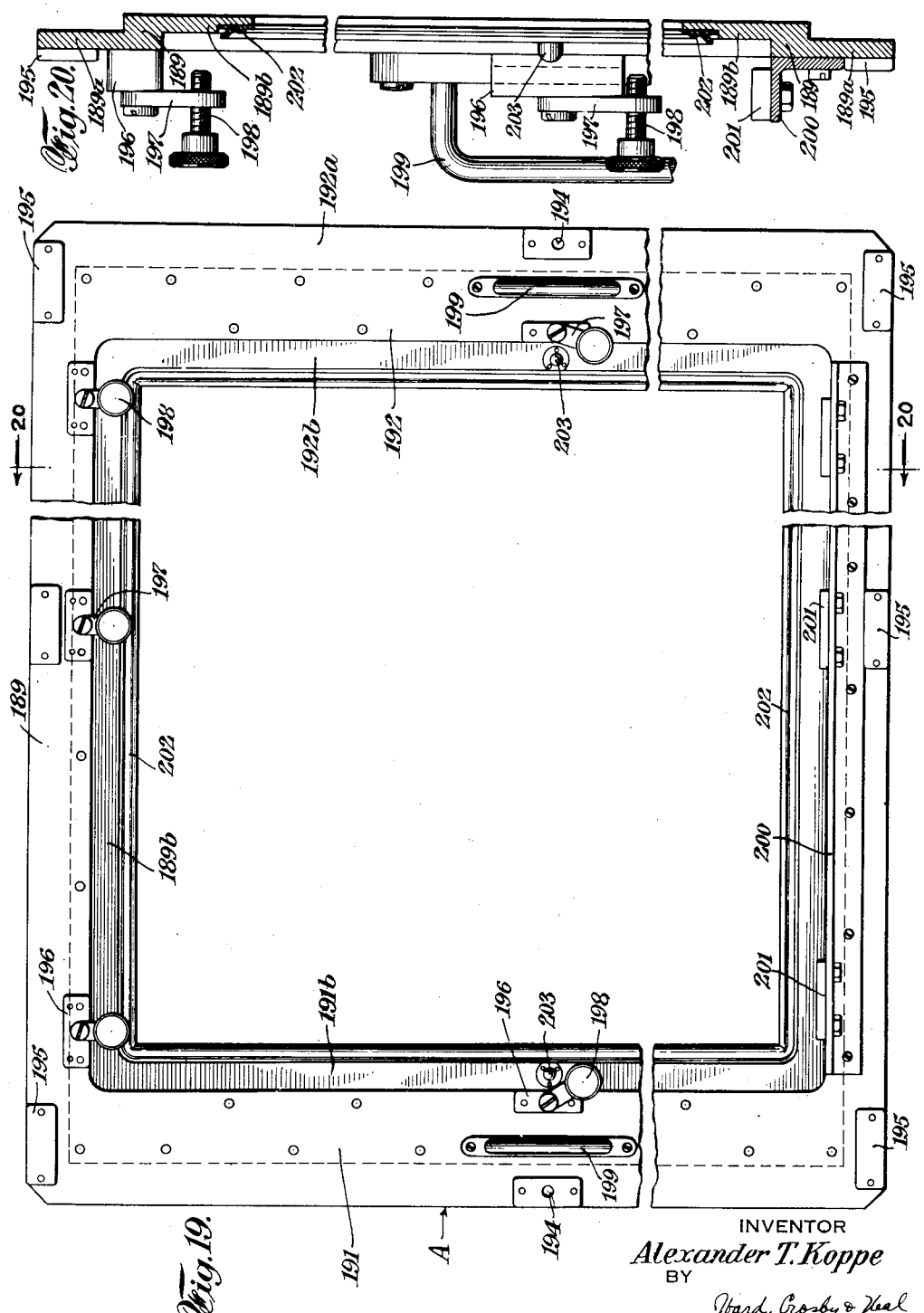

Oct. 3, 1939.  A. T. KOPPE  2,174,726
PHOTOCOMPOSING MACHINE
Filed Feb. 6, 1936  14 Sheets-Sheet 14
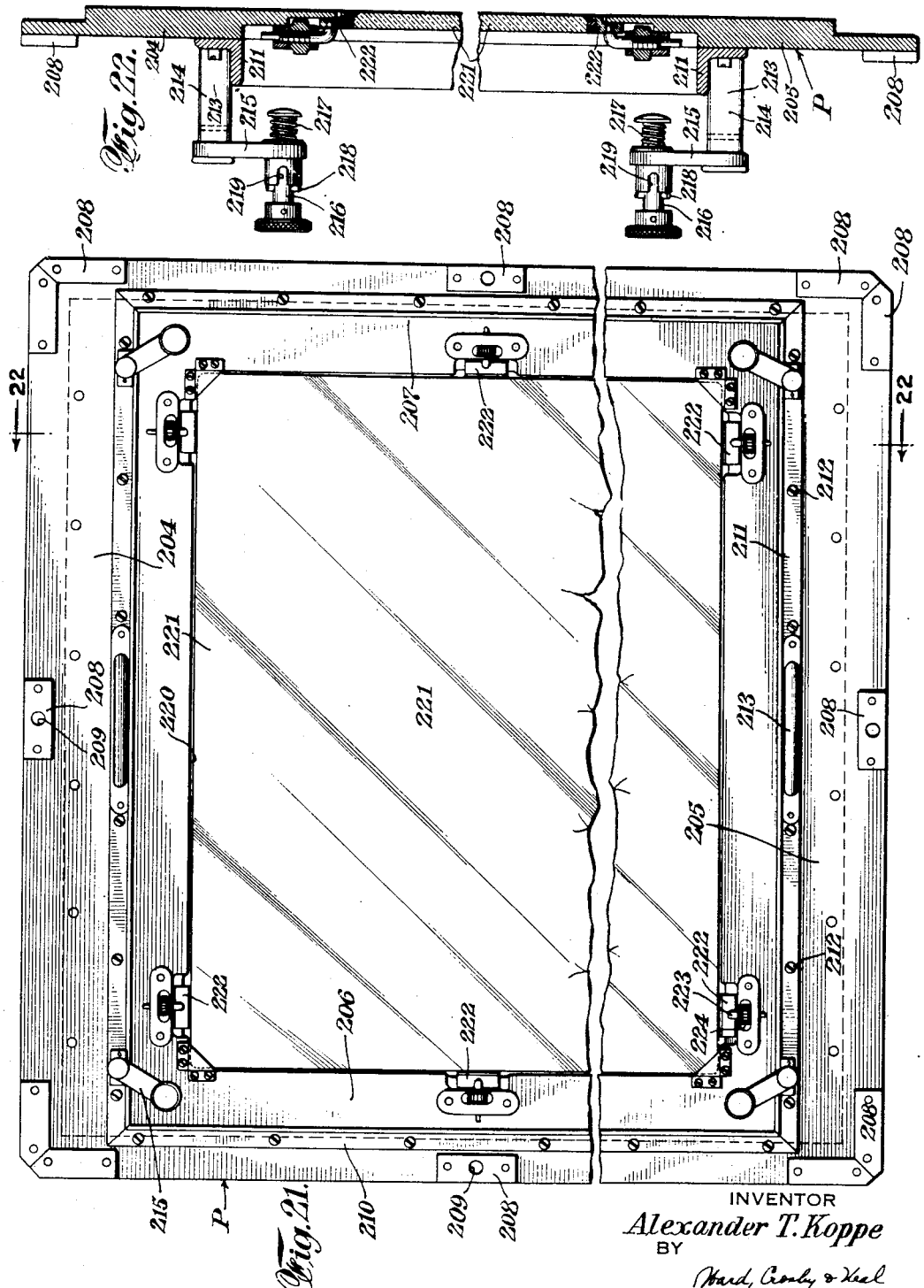
INVENTOR
*Alexander T. Koppe*
BY
*Ward, Crosby & Neal*
ATTORNEYS Patented Oct. 3, 1939

2,174,726

UNITED STATES PATENT OFFICE 2,174,726

PHOTOCOMPOSING MACHINE

Alexander T. Koppe, Hasbrouck Heights, N. J., assignor to General Printing Ink Corporation, New York, N. Y., a corporation of Delaware Application February 6, 1936, Serial No. 62,588

10 Claims. (Cl. 95—76)

My invention relates to improvements in photo-composing machines.

My invention has particular reference to a novel arrangement for sealing an area or zone of a sensitized surface so as to produce a vacuum chamber within which a suitable printing member is enclosed.

My invention has further reference to various features of a photo-composing machine such, for example, as a novel control system for effecting movement of a backboard in a desired manner, an efficient mechanical arrangement for imparting positioning movements to a supporting frame for a printing plate holder, etc.

Various other objects, advantages and characteristics of my invention will become apparent from the following description.

My invention resides in the photo-composing machines, features, combinations and arrangements of the character hereinafter described and claimed.

For an understanding of my invention and for an illustration of one of the many forms thereof, reference is to be had to the accompanying drawings, in which:

Fig. 3a is an enlarged, vertical sectional view, partly in elevation, showing a modified arrangement for holding the printing plate in printing position;

Fig. 4 is a horizontal sectional view, partly in plan and with parts omitted, this view being taken centrally of the machine shown in Fig. 1;

Fig. 5 is an enlarged, horizontal sectional view, with parts omitted and partly in plan, this view being taken on the left of the line 5—5 of Fig. 1 looking in the direction of the arrows;

Fig. 5b is an enlarged, horizontal sectional view, with parts omitted and partly in plan, this view being taken on the right of the line 5—5 of Fig. 1 looking in the direction of the arrows, Figs. 5 and 5b being combinable on the line B—B;

Fig. 5a is an enlarged, horizontal sectional view, partly in plan, showing the same modified arrangement as illustrated in Fig. 3a;

Fig. 6 is a fragmentary, horizontal sectional view showing a detail of my novel sealing arrangement;

Fig. 7 is an enlarged, horizontal sectional view, partly in plan and with parts omitted, of the right side of the machine shown in Fig. 1;

Fig. 8 is an enlarged, horizontal sectional view, partly in plan and with parts omitted, of the left side of the machine shown in Fig. 1;

Fig. 9 is a fragmentary, elevational view showing a part of the rear of the machine of Fig. 1;

Fig. 10 is an enlarged, horizontal sectional view, partly in plan, and is taken on the line 10—10 of Fig. 2 looking in the direction of the arrows;

Fig. 11 is an enlarged, horizontal sectional view, partly in plan, and is taken on the line 11—11 of Fig. 2 looking in the direction of the arrows;

Fig. 12 is an enlarged, horizontal sectional view, partly in plan, and is taken on the line 12—12 of Fig. 2 looking in the direction of the arrows;

Fig. 14 is a side elevational view, taken substantially on the line 14—14 of Fig. 8;

Fig. 15 is a side elevational view corresponding with Fig. 14 but showing the parts in different positions, respectively;

Fig. 16 is an enlarged sectional view taken substantially on the line 16—16 of Fig. 4 looking in the direction of the arrows;

Fig. 16a is a fragmentary plan view of a part of the arrangement shown in Fig. 16;

Fig. 17 is an elevational view, with parts omitted showing the rear of my novel photo-composing machine;

Fig. 18 is a perspective view showing the shifting mechanism for shifting the backboard toward and from printing position;

Fig. 18a is a perspective view corresponding with Fig. 18 but showing a different position of some of the parts;

Fig. 19 is an enlarged, elevational view showing an adapter frame;

Fig. 20 is a transverse vertical sectional view, partly in elevation, and is taken on the line 20—20 of Fig. 19 looking in the direction of the arrows;

Fig. 21 is an enlarged elevational view, partly broken away, of the negative-holding frame; and Fig. 22 is a transverse, vertical sectional view, partly in elevation, and is taken on the line 22—22 of Fig. 21 looking in the direction of the arrows.

Figure 1:
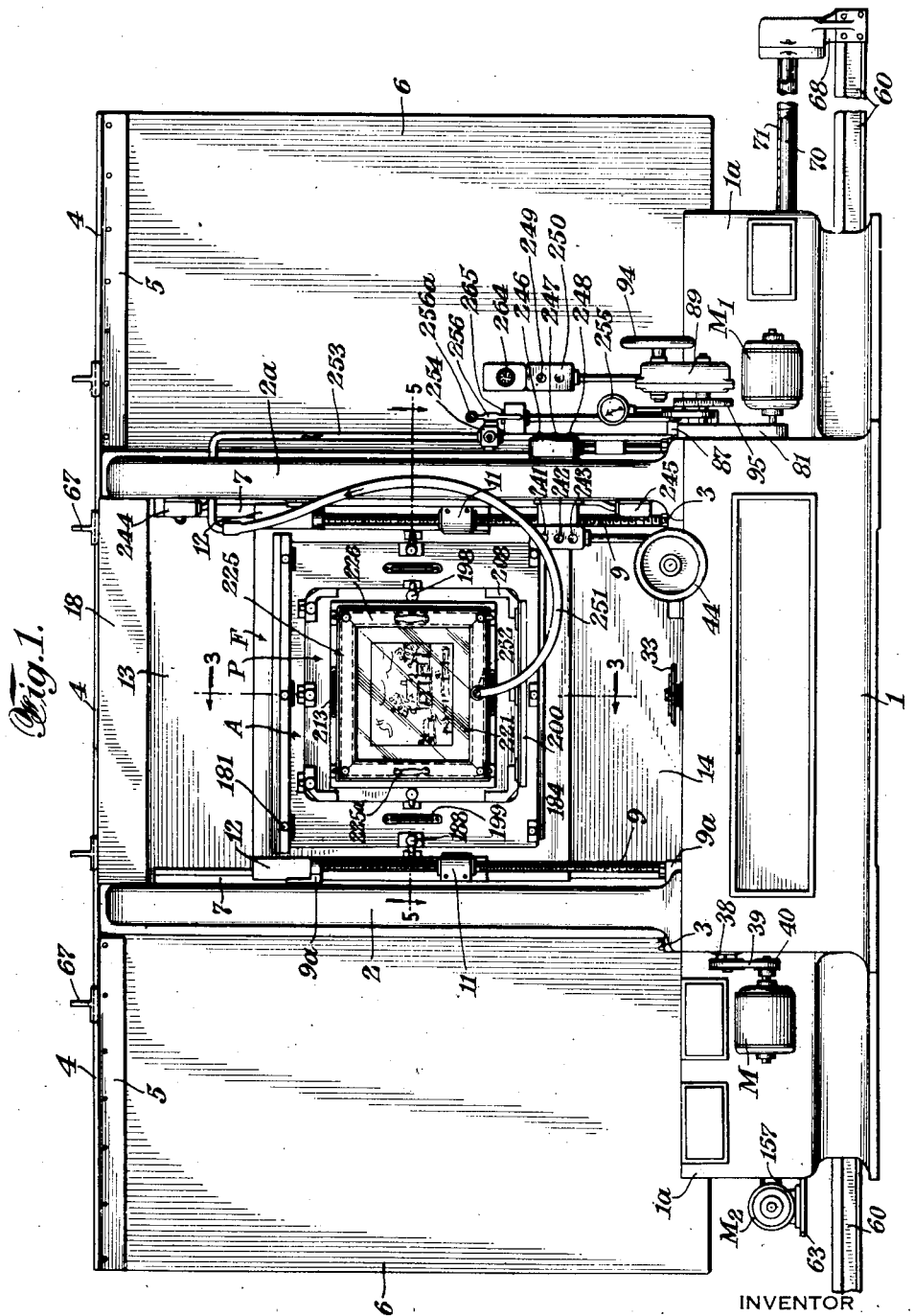
Figure 1 is an elevational view of my novel photo-composing machine as viewed from the front.

Referring to Fig. 1, there is shown a hollow base 1 which is adapted to occupy a fixed position on a floor or other suitable supporting surface. As illustrated, the base 1 comprises oppositely extending wing sections 1a, 1a, these being utilizable in the manner hereinafter described. Upstanding from said base 1 are a pair of standards 2, 2a, these standards being vertically disposed in parallel relation and suitably secured to the base 1, as by the bolts 3. Suitably fastened in fixed position to the top surfaces of the standards 2, 2a is a horizontal bar 4 formed from non-flexible metallic material. This bar 4 extends equal distances beyond each of the standards 2, 2a and each projecting section of said bar 4 has an angle member 5 suitably secured thereto. As clearly shown in Fig. 1, a vertical wing member 6 is suitably secured, as by screws or bolts, to each angle member 5, to the adjacent base wing section 1a which is disposed therebelow, and to the adjacent standard 2 or 2a as the case may be. It results, therefore, with an arrangement of the character described, that the wings 6 are vertically disposed in the same vertical plane and that they form fixed extensions of the base 1. Preferably although not necessarily, each of the wings 6 is formed from a sheet of wood which is covered by suitable sheet metal shaped to form smooth, flat inner and outer surfaces.

Figure 2:
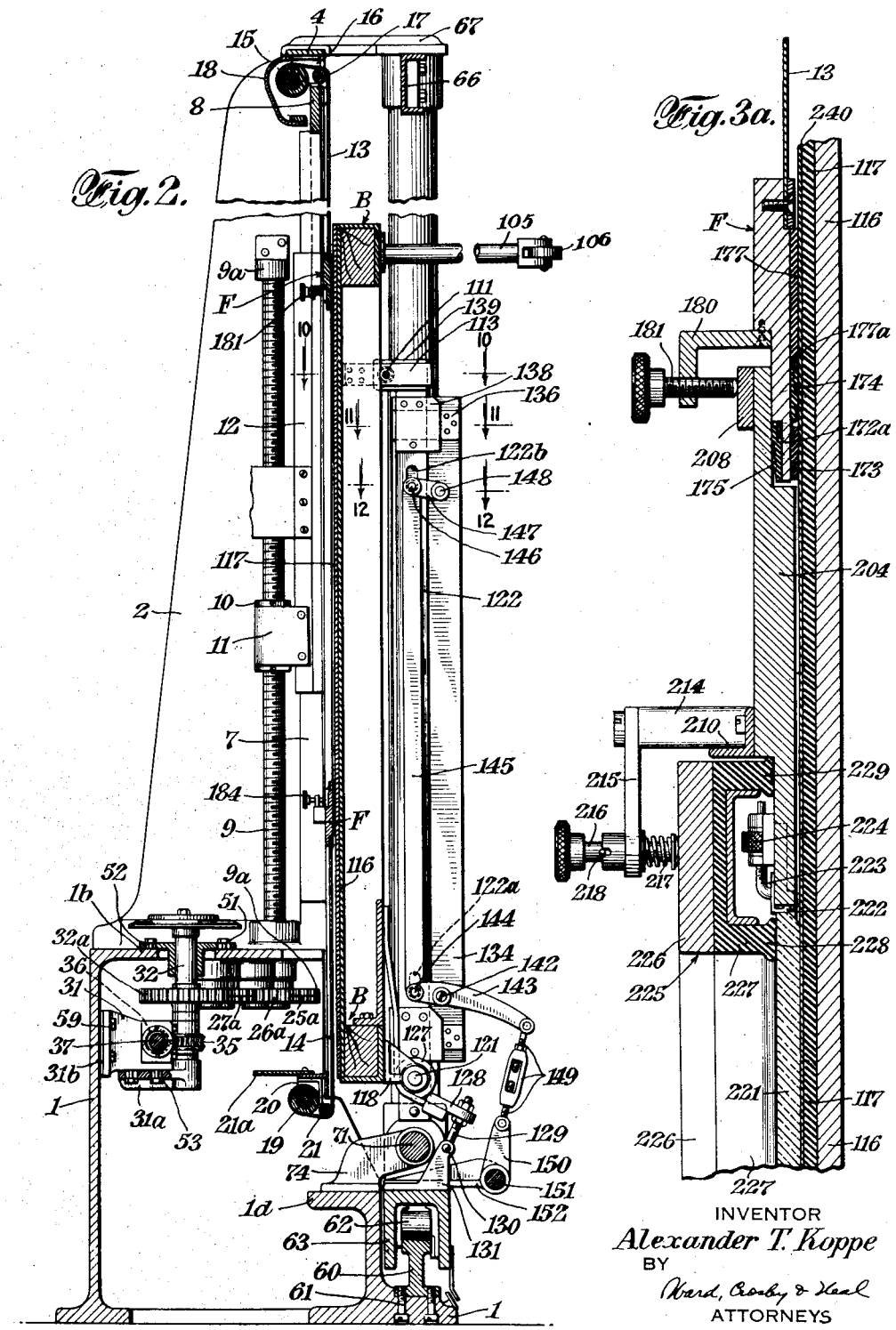
Fig. 2 is a transverse, vertical sectional view, partly in elevation and with parts omitted, taken substantially centrally of the machine shown in Fig. 1.

As shown in Figs. 1 and 2, each of the standards 2, 2a has a vertical track member 7 suitably secured thereto in fixed position, the top surfaces of said track members 7 being connected together by a transversely, horizontal member 8. The track members 7 are disposed in the same vertical plane, this plane being parallel with respect to the plane of the wings 6 and closely adjacent thereto.

Vertically disposed immediately adjacent each of the track members 7 is a jack screw 9, these jack screws being rotatably mounted in upper and lower bearings 9a formed in projecting sections of the respective standards 2, 2a.

Coactable with each of the jack screws 9 is a travelling nut 10, each nut 10 carrying a bracket arm 11, Fig. 2, the bracket arms 11 being secured in suitable manner to the respective slide members 12 which slidably engage the track members 7, respectively, Fig. 5, the hereinafter described frame F also coacting with said track members 7 in a guiding sense. As well understood in the art, the slide members 12 coact with their respective track members to prevent horizontal play while providing for the desired freedom of movement between coacting parts. Each of the slide members 12, then, is positioned adjacent one of the jack screws 9 and said slide members 12 are bolted or otherwise suitably secured to the opposite vertical sides, respectively, of a supporting frame F having a rectangular opening.

This supporting frame F is adapted to move either upwardly or downwardly in the space between the two track members 7. As shown in Figs. 1 and 2, upper and lower curtains 13 and 14 are connected to the respective upper and lower sides of the supporting frame F. The upper curtain 13 is wound upon a horizontal roller 15 supported by end brackets 16 carried by and depending from the bar 4, Fig. 2, these end brackets also supporting a horizontal idler roller 17 utilizable for guiding said upper curtain 13. As shown in Figs. 1 and 2, a cover member 18 is secured to the bar 4, this member being utilizable for partially enclosing the roller 15 and associated parts. The lower curtain 14 is wound upon a horizontal roller 19 supported by end brackets 20 suitably held in fixed position interiorly of the base 1. The end brackets 20 also support a horizontal idler roller 21 cooperative with the lower curtain 14 as shown in Fig. 2. Disposed above the roller 19 and suitably held in fixed position is a light shield 21a which extends transversely across the base 1 for the purpose of preventing the passage of light into engagement with the hereinafter described light-sensitive surface.

In order that the jack screws 9 may be rotated at exactly the same speed and in the same direction, I have provided, in accordance with the invention, a combined motor-manual control arrangement of novel character as hereinafter described.

Thus, as shown in Figs. 1, 2 and 4, the front horizontal surface 1b of the base 1 carries bearings for and supports a plurality of spaced vertical stub shafts 25, 26, 27, 28, 29 and 30, these shafts depending into the hollow interior of the base 1 and having secured thereto the respective pinions 25a, 26a, 27a, 28a, 29a and 30a. Further, as shown, the lower end of each jack screw 9, interiorly of said base 1, has a pinion 9a secured thereto. All of the pinions just referred to are duplicates of each other and, as illustrated, the arrangement is such that the pinion 27a meshes with the pinion 26a, which meshes with the pinion 25a, the latter, in turn, meshing with the jack screw pinion 9a at the left, Fig. 4. Similarly, the pinion 28a meshes with the pinion 29a which meshes with the pinion 30a, the latter, in turn, meshing with the jack screw pinion 9a at the right, Fig. 4.

Referring to Fig. 2, the front vertical wall of the base 1 is shown as supporting a bracket 31 which carries a lower bearing 31a for a vertical shaft 32 having an upper bearing at the aforesaid surface 1b, the shaft 32 being spaced substantially equi-distantly from the above noted stub shafts 27 and 28. The shaft 32, interiorly of the hollow base 1 carries a pinion 32a which is a duplicate of the various pinions 26a, 27a, etc., said pinion 32a meshing with the aforesaid pinions 27a, 28a as shown in Fig. 4. The shaft 32 extends above the aforesaid horizontal surface 1b and carries a circular micrometer disk 33 cooperative with a fixed pointer member 34, Fig. 4.

The lower end of the shaft 32 carries a worm wheel 35, Fig. 4, with which meshes a worm 36 secured to a horizontal shaft 37 suitably supported in a bearing formed by the aforesaid bracket 31 and in other bearings as hereinafter described.

One end of this shaft 37 extends beyond the base 1 and carries a pulley 38 which is driven by an endless belt 39 driven, in turn, by a pulley 40 carried by the armature shaft of an electric motor M. The other end of said shaft 37 terminates interiorly of the hollow base 1 and carries a gear 41 which meshes with a gear 42 carried by a suitably supported shaft 43, Fig. 4. Disposed in a bearing formed in the horizontal surface 1b is a shaft which carries an operating hand wheel 44, this shaft last named being operatively connected to the aforesaid shaft 43 by an endless chain 45, or equivalent.

It is highly desirable, in accordance with the invention, that backlash and lost motion be largely or entirely eliminated from the gear trains between the pinion 32a and the respective pinions 9a of the jack screws 9. To this end, as shown, the pinions 25a, 27a, 28a and 30a may be constructed as illustrated in Figs. 16 and 16a in connection with the pinion 28a. That is, each of said pinions, at the periphery thereof, may be provided with a peripheral, circular recess 46 in which is received a gear ring 47 having elongated, arcuate slots 48 alined with the respective threaded passages 49 formed in said pinion 28a. Extending through each slot 48 and threaded into the adjacent passage 49 is a screw 50. As will be understood, the teeth of the gear ring 47 and those of the pinion 28a correspond with each other.

With the parts positioned as shown in Fig. 4, it will be understood that the four screws 50 may be loosened whereupon the gear ring 47 may be moved to slight extent on and circumferentially of the pinion 28a. By so doing, lost motion is eliminated between the pinions 29a, 32a and the connecting pinion 28a (including its gear ring 47). Then, by tightening said screws 50, the gear ring 47 is clamped in its adjusted position to the pinion 28a. The gear teeth of said pinion 28a and the gear ring 47, after adjustment of the latter has been effected, are related as shown by the full and broken lines in Fig. 16a and, because thus related, backlash and lost motion between the pinions 29a, 32a and the interconnecting pinion 28a are substantially entirely eliminated.

As will readily be understood, corresponding adjustments effected on the gear rings 47 of the respective pinions 25a, 27a and 30a results in the elimination of backlash and lost motion between the pinion 32a and the two jack screw pinions 9a. It results, therefore, that the position of the disk 33 necessarily reflects with extreme accuracy the position of and all adjustments which are imparted to the jack screws 9.

As shown in Fig. 2, the upper bearing for the aforesaid shaft 32 is constituted by a member 51 having elongated slots through which extend the respective bolts 52 securing said member 51 to the base surface 1b. In generally the same manner, the bolts 53 which secure the lower bearing 31a of the shaft 32 to the bracket 31 extend through elongated slots as shown. By virtue of this adjustable arrangement, it follows that the bolts 52 and 53 may be loosened so as to permit the shaft 32 and its pinion 32a to have a limited degree of movement. Accordingly, the pinion 32a may readily take such a position that it is in proper meshing relation with respect to the pinions 27a and 28a after they have been set as described above in order to avoid backlash.

After the pinion 32a has been positioned as described immediately above and then locked in position by tightening of the bolts 52 and 53, it may be that the worm 36 is not in proper meshing relation with the worm wheel 35—the latter necessarily moves with the shaft 32 and pinion 32a during the adjusting movements imparted to the pinion 32a. In order to care for this condition, if it should occur, I provide a compensating arrangement of the following character.

As shown in Fig. 4, the bearing 55 for one end of the shaft 37 is secured to the base 1 by bolts 56 which extend through elongated slots provided, respectively, therefor in said bearing 55. The other end of said shaft 37 is supported in a bearing arrangement 57 having a plurality of elongated slots through which extend the respective bolts 58 securing said bearing arrangement 57 to its supporting structure. Furthermore, as illustrated in Figs. 2 and 4, the bracket 31 is secured to the base 1 by bolts 59.

After the pinion 32a has been so adjusted as to be in proper meshing relation with the pinions 27a and 28a as described above, the various bolts 56, 58 and 59 may be loosened whereupon the shaft 37 may be moved from left to right, Fig. 2, to thereby cause the two gear wheels 36 and 35 to assume a proper meshing relation. At this time, a flat shim 31b may be placed between the base of the bracket 31 and the adjacent surface of the base 1 and, then, said bolts 56, 58 and 59 may be tightened to positively maintain the gear wheel 36 in the position to which adjusted.

As shown in Fig. 4, one of the stub shafts for the pinions 25a, 26a, etc. such, for example, as the shaft 25 may have connected thereto a gear 59a which meshes with and drives another gear 59b secured to a shaft 59c utilizable for operating suitable mechanism 59d for counting and indicating the revolutions imparted to the shaft 25.

The aforesaid base 1 and its wing sections 1a, 1a form a supporting structure to which a fixed track member 60 is secured in suitable manner, as by the bolts 61, Fig. 2. Supported by this track member 60, through the anti-friction rollers 62, is a carriage 63, Fig. 2, the length of which is somewhat less than that of the track member 60. Secured to and upstanding from each end of the carriage 63 is a bracket member 64, each of which supports a standard 65, the height of these standards being substantially the same as the combined height of the aforesaid base 1 and wing sections 6, and said standards 65, at the top thereof, being connected together by a horizontal member 66. These standards 65 and their horizontal connecting member 66 form a structure which extends vertically in spaced relation with respect to the adjacent wing sections 6. For guiding and steadying purposes, it is desirable that a plurality of horizontal members 67 be secured to the connecting member 66, these members 67 slidably gripping the above described bar 4 to which the wing sections 6 are secured.

In the form of the invention herein illustrated, the track member 60 extends to the right, when the machine is positioned as in Fig. 1, and the end of said track member at the right has an upstanding standard 68 secured thereto, this standard, as shown in Fig. 7, supporting a housing 69 forming end bearings for a drive shaft 70 and a screw shaft 71. Rotatable with these shafts 70 and 71 and disposed within the housing 69 are the respective gears 72 and 73 which are disposed in meshing relation, the gear 73 comprising a ring 73a corresponding with and operating the same as the ring gear 47 for removing backlash.

The screw shaft 71 extends from right to left, Fig. 7 horizontally above the carriage 63 and is disposed in a passage in that bracket 64 at the right of the machine, when viewed from the front, said passage being larger than the screw shaft 71 and free from threads. At its end remote from the housing 69, the screw shaft 71 has a rotatable bearing in a bracket 74 fixed to the upper surface of a section 1d of the base 1, Fig. 2.

For purposes of accurate adjustment, it is desirable that the carriage 63 support another bracket 75 which supports a pair of internally threaded nut devices 76 through which the screw shaft 71 extends and to which said shaft is threaded, these nut devices 76, as well understood in the photocomposing machine art, coacting with said screw shaft to prevent "whip" and backlash.

The drive shaft 70 extends from right to left, Fig. 7, and has bearing engagement with surfaces of the adjacent base wing section 1a. Said shaft 70, at its end remote from the housing 69, terminates in a spiral gear 76a which meshes with a spiral gear 76b carried by one end of a shaft 76c mounted in bearings formed in a bracket secured to the interior surface of said last named wing section 1a. The other end of the shaft 76c carries a spiral gear 76e which meshes with a spiral gear 76f secured at one end of a stub shaft 77 mounted in a bearing in the aforesaid wing section 1a. By the use of take-up means 76h, Fig. 7, coactable with their engaging spiral gears 76a and 76f, backlash is removed from the gear connection between the shafts 77 and 70.

Figure 13:
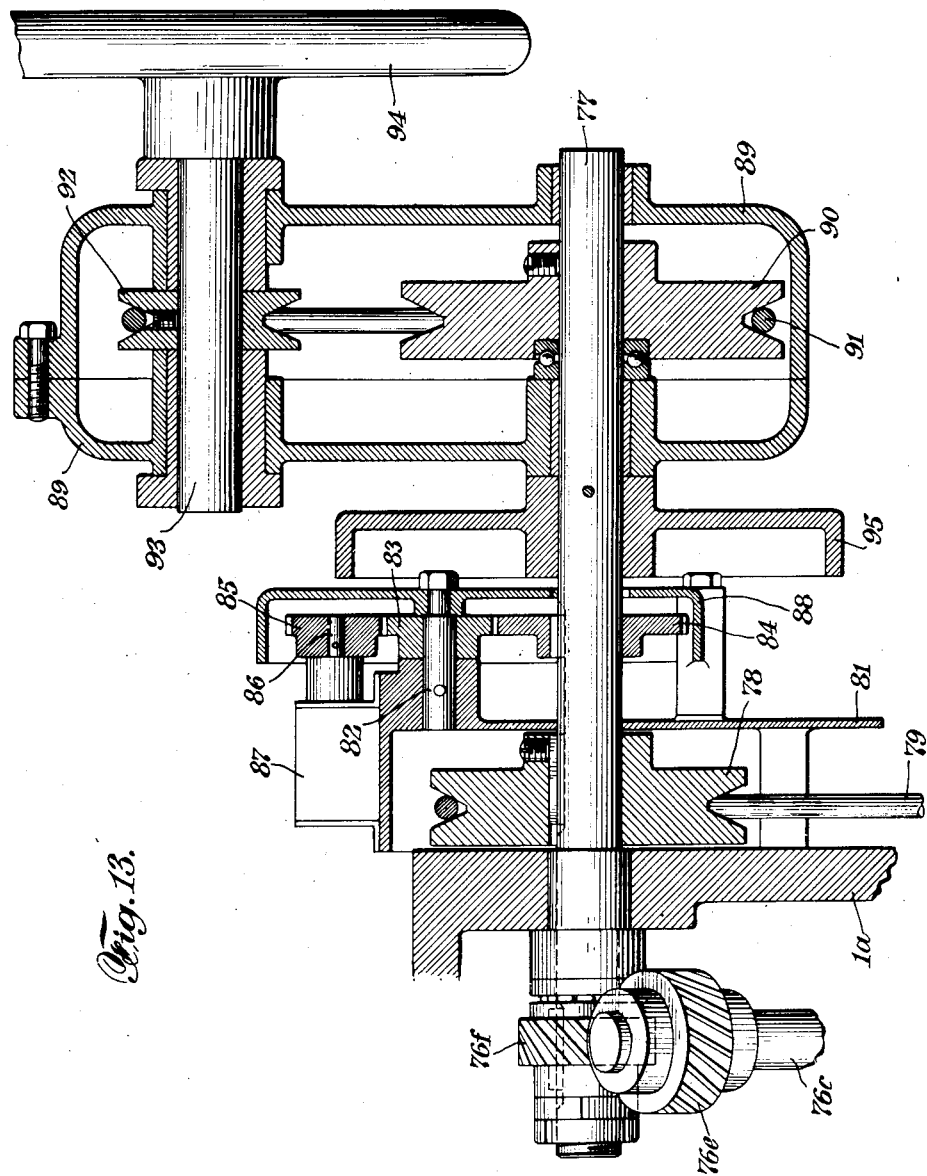
Fig. 13 is an enlarged, vertical sectional view, partly in elevation, showing a part of the adjusting apparatus.

Immediately adjacent the exterior surface of the wing section last named, Fig. 13, the stub shaft 77 has secured thereto a pulley 78 with which coacts an endless belt 79 disposed in driving relation on a second pulley 80, Fig. 7, secured to the armature shaft of an electric motor M1 suitably secured to said wing section 1a.

The pulley and belt mechanism just described is disposed interiorly of a fixed housing 81 which supports, as shown in Fig. 13, an axle 82 on which a gear wheel 83 is rotatably mounted, this gear wheel 83 meshing with a driving gear wheel 84 mounted on and driven by the stub shaft 77, and said gear wheel 83 also meshing with a driven gear wheel 85 fixed to a shaft 86 which operates suitable counter mechanism 87 mounted on said housing 81. As shown, the gear wheels 83, 84 and 85 are mounted on a housing 88 suitably supported, as by the aforesaid axle 82.

Disposed at the free end of the shaft 77 is a housing 89 which encloses a pulley 90 secured to and rotatable with said shaft 77. Engaging the pulley 90 is an endless belt 91 which also engages another pulley 92 secured to a shaft 93 rotatable in bearings in said housing 89, the shaft 93 having secured thereto an operating hand wheel 94 which is mounted exteriorly of the aforesaid housing 89. Secured directly to and rotatable with the shaft 77 is a micrometer wheel 95, the latter being disposed between the two housings 88 and 89.

In the form of the invention herein shown, a pivoted backboard B is utilized for the reception of the press plate, sensitized member or light-sensitive surface or member. This backboard B is positioned between the standards 65, 65, and, as hereinafter described, is adapted to occupy either a vertical or horizontal position.

As herein illustrated, the backboard B comprises a rectangular frame formed from vertical side members 100, 100 and the horizontal top and bottom members 101, 101, said frame being braced in any suitable manner, as by the vertical members 102, the horizontal members 103 and the diagonal members 104, the latter being suitably arranged to prevent warping of the backboard structure. As shown, the free end of the backboard B may carry supporting legs 105 each of which may terminate in a roller 106. Further, the rear surface of the backboard B preferably carries a handle member 107 utilizable for lowering and raising said backboard. Still further, said rear surface of the backboard B carries a lever 108 having an actuating handle 108a, said lever being pivoted at 109. Pivoted to opposite ends of the lever 108 are the respective links 110, each of which terminates in a rod 111 guided for horizontal movement by a bracket 112.

Suitably secured to the rear surface of the backboard B and at the respective opposite sides thereof are the brackets 113, Fig. 10, which extend at right angles to the operative surface of said backboard B and each of which terminates in a lateral section 113a, each lateral section 113, if desired, having a bolt, not shown, adjustably threaded therethrough. Each bracket 113 is formed with a transverse passage 113b, these passages being alined with the respective passages of the aforesaid brackets 112. It follows, therefore, that each rod 111 is readily slidable in the passage through its associated bracket 112 and the passage 113b in the adjacent bracket 112.

As shown in Fig. 2, the aforesaid frame of the backboard B has a supporting structure 116 secured thereto in suitable manner, this supporting structure being formed from fibre or other suitable material and supporting an outer surface 117 formed from hard rubber, or equivalent, to which the light-sensitive member is secured in the manner hereinafter described.

Secured in horizontal alinement to the bottom frame member 101 of the backboard B are a plurality of brackets 118. As shown in Fig. 17, the two brackets at the left of the backboard B support a horizontally disposed axle member 119, the two brackets at the right of said backboard B support a horizontal axle member 120, and the three brackets centrally of said backboard support a horizontal axle member 121.

As clearly appears, the outer respective ends of the axle members 119 and 120 are received in passages formed, respectively, in vertically disposed members 122, the outer end of each axle member 119 and 120 preferably having a locking nut 123 threaded thereto. For purposes of ready alinement, it is desirable that the aforesaid passages in the members 122 be formed substantially larger than the ends of the axle members 119, 120 and that blocks 124 be suitably secured to the respective lower ends of said members 122, each of these blocks having a passage which snugly receives the end of the adjacent axle member 119 or 120 and said blocks being adjustable on the lower ends of said members 122 so that the respective passages thereof may accurately be alined with the axle members 119, 120, respectively.

As shown in Fig. 9, the carriage 63 supports an upwardly-extending bracket 125 having a flat upper surface upon which rests a collar 126 secured to the axle member 121. Accordingly, as will be understood, the bracket 125 serves as a support for the backboard B through the instrumentality of the axle member 121 and associated parts.

As illustrated in Fig. 9, the axle member 119 supports a spiral spring 127, one end 127a of which engages the rear surface of the backboard B and the other end 127b of which is secured to a lug 128 having a slotted outer end in which is secured the upper end of a lever 129 pivoted at 130 to a bracket 131 supported by the carriage 63.

As herein disclosed, the axle member 120 supports a similar spiral spring arrangement and the axle member 121 supports a pair of said spiral spring arrangements.

When the backboard B is in its vertical position, the aforesaid spiral springs 127 are unwound or substantially so. However, when said backboard is manually lowered toward and to its horizontal position, these springs 127 are automatically wound or energized. Therefore, as will readily be understood, said springs 127 serve to counterbalance and cushion movement of said backboard B.

As hereinafter described, the backboard B is adapted to be moved either toward or from the hereinbefore described supporting frame F. To this end, each of the standards 65 supports an adjusting mechanism utilizable for moving the backboard B to and fro as just stated.

In accordance with this phase of the invention, the standard 65 at the left of the machine as viewed when facing the front thereof has upper and lower blocks 132 and 133 fixed thereto, these blocks supporting a fixed member 134. Suitably secured, as by the bolts 135, to the fixed member 134 are the upper and lower key members 136 each being cut away as indicated at 136a and the cut-away sections being disposed in vertical alinement so as to receive the aforesaid vertical member 122 which is adapted to be moved, while held vertical, toward or from the aforesaid supporting frame F. Slidable horizontally on each key 136 is a block 138, these blocks being secured to said member 122 by the bolts 137. Above the upper block 138, the vertical member 122 has a member 139 secured thereto by the bolts 140, this member 139 carrying a lateral socket member 141 adapted, when the backboard B is in vertical position, to be in alinement with the path of movement of the aforesaid rod 111.

Pivoted at 142 to the fixed member 134, adjacent the lower end thereof, is a lever 143 having its outer end connected by a pivot pin 144 to a strap member 145, one end of the pivot pin 144 being operatively related to an elongated slot 122a formed in the lower end of the aforesaid vertical member 122. The strap member 145 extends in a vertical direction and is disposed flatwise against the vertical member 122. At its upper end, said strap member 145 carries a pivot pin 146 on which a lever 147 is loosely supported, the latter being pivoted to the fixed member 134 by a pivot pin 148, and the pin 146 being operatively related to an elongated slot 122b formed in the upper end of the vertical member 122.

Connected to the lever 143 is an adjustable link arrangement 149 adapted to partake of pivotal movement, this link arrangement being connected to an arm 150 oscillatable with a horizontal shaft 151 mounted in bearings 152 supported by the aforesaid carriage 63.

As stated above, each of the standards 65 supports an adjusting mechanism for shifting the backboard B in the manner described. Inasmuch as the adjusting mechanism for the other standard 65 is a duplicate of the one just described, this description will not be repeated and, on the drawings, duplicate reference characters will be used for the designation of corresponding parts.

Accordingly, in view of the description given above, it will be understood that the shaft 151 carries two arms 150 which, through the described mechanisms, impart to and fro movement to the backboard B. For imparting rotatable movement to this shaft 151, there may be utilized an arrangement of the character shown in Figs. 8, 14 and 15 wherein the shaft 151 is shown as carrying a disk 153 which cooperates with a second disk 154 of generally similar configuration, the disk 154 being mounted on a shaft which extends from a box 155 containing suitable gear reduction mechanism, power to which is delivered by a shaft 155a carrying a pulley 156 engaged by an endless belt 157 driven by a second pulley 158 mounted on the armature shaft of a suitable electrical motor M2 mounted in suitable manner on an extension of the carriage 63.

As illustrated in Figs. 14 and 15, the disks 153, 154 are provided, respectively, with gear segments 153a, 154a whereby power is transmitted from the disk 154 to the disk 153.

In accordance with the invention, it is desirable that suitable shock-absorbing mechanism be provided for cushioning the impact transmitted from the disk 154 to the disk 153 when power is applied to said disk 154. A preferred form of such shock-absorbing mechanism is shown in Figs. 14 and 15.

Thus, on supports 159, 160 extending laterally from the disk 153 are mounted the respective levers 161, 162 which are engaged, respectively, by springs 163, 164, each spring seating against a member 165 fixed to the disk 153 and each spring normally holding its associated lever in engagement with a stop 166. These springs are relatively "heavy" so that each of them absorbs a large amount of the instantaneous power of the motor M2 at the instant that a driving connection is established between the disks 154 and 153. The disk 154 is mounted on a shaft 167 which extends from the aforesaid gear box 155. Secured to an extension of this shaft is a collar 168 having an actuating lug 169 carried thereby and projecting therefrom.

With the various parts positioned as shown in Fig. 14, the backboard B is in its advanced position toward the printing plate. If it becomes desirable to move said backboard toward the rear of the machine, the motor M2 is energized in the manner hereinafter described to cause the disk 154 and its actuating lug 169 to move in a clockwise direction, Fig. 14, from the full line representation of the parts.

As the two disks 153 and 154 are positioned in Fig. 14, a curved sector 153b of the disk 153 is disposed concentrically with respect to the shaft 167 and closely adjacent the periphery of the disk 154. Therefore, as the disk 154 starts to move in a clockwise direction from the full line position thereof shown in Fig. 14, the disk 153 necessarily remains stationary.

Eventually, as the disk 154 moves in the direction last described, the inclined surface 169a of the actuating lug 169 comes into engagement with the curved surface 161a of the lever 161 and moves said lever 161 slightly, as a distance of .010 of an inch more or less, in a counterclockwise direction, Fig. 14, with resultant compression of the spring 163 and absorption of shock. After said lever 161 has moved approximately the distance just described, the gear tooth 154b of the disk 154 comes into engagement with the gear tooth 153c of the disk 153. Thereupon, the teeth of the gear segment 154a positively engage the teeth of the gear segment 153a to move the disk 153 in a counter-clockwise direction, Fig. 14.

At each end of the gear segment 154a, the material of the disk 154 is cut away to form the clearance passages 154c and 154d, the length of these passages being approximately one-half the length of the curved sector 153b of the disk 153. Therefore, with the disk 154 positioned as shown by the broken lines of Fig. 14—when movement of the disk 153 in a counter-clockwise direction, Fig. 14, is just being initiated—there is clearance space in the disk 154 for the material defining the rear surface of the sector 153b of the disk 154.

Movement of the disk 153 in a counter-clockwise direction, Fig. 14, under the control of the disk 154, continues until the two gear segments 153a, 154a are disengaged. At this time, a limit switch mechanism shown generally at 151c, Fig. 8, is operated to open the circuit of the motor M2 and, also at this time, the disk 153 becomes stationary by reason of the fact that the curved sector 153d thereof assumes a position wherein it is concentric with respect to the shaft 167 and closely adjacent the periphery of the disk 154. Further, when the disk 153 becomes stationary as just described, the backboard B is in its retracted position, removed from the printing plate. Immediately after the circuit of the motor M2 is opened as just described, the disk 154 coasts approximately to the position shown by the broken lines in Fig. 15.

When the backboard B is to be moved toward the front of the machine, an operation is performed which is the reverse of that described above. That is, the motor M2 is energized in the manner hereinafter described to cause the disk 154 and its actuating lug 169 to move in a counterclockwise direction, Fig. 15, from the broken line representation of the parts.

As the two disks 153 and 154 are positioned in Fig. 15, the curved sector 153d of the disk 153 is positioned as shown and as described above. Therefore, as the disk 154 starts to move in a counter-clockwise direction from the broken line position thereof shown in Fig. 15, the disk 153 necessarily remains stationary.

As the disk 154 continues to move in a counterclockwise direction as last noted, the inclined surface 169b of the actuating lug 169 comes into engagement with the curved surface 162a of the lever 162 and moves said lever 162 to slight extent in a clockwise direction, Fig. 15, with resultant compression of the spring 164 and absorption of shock. After said lever 162 has been moved slightly as just stated, the gear tooth 154e of the disk 154 comes into engagement with the gear tooth 153e of the disk 153. Thereupon, the teeth of the gear segment 154a positively engage the teeth of the gear segment 153a to move the disk 153 in a clockwise direction, Fig. 15. During initial movement of said disk 153, the clearance space 154c serves to prevent binding between the rear surface of the sector 153d and the adjacent face of the disk 154.

Movement of the disk 153 in a clockwise direction, Fig. 15, under the control of the disk 154, continues until the two gear segments 153a, 154a are disengaged. At this time, the aforesaid limit switch mechanism 151c is again operated to open the circuit of the motor M2 and, also at this time, the disk 153 becomes stationary due to the fact that the curved section 153b thereof has again assumed a position wherein it is concentric with respect to the shaft 167 and closely adjacent the periphery of the disk 154. When the disk 153 becomes stationary as just stated, the backboard B is in its advanced position toward the printing plate. Immediately after the circuit of the motor M2 is opened as last described, the disk 154 coasts to the approximate position shown by the full lines in Fig. 14.

Figure 3:
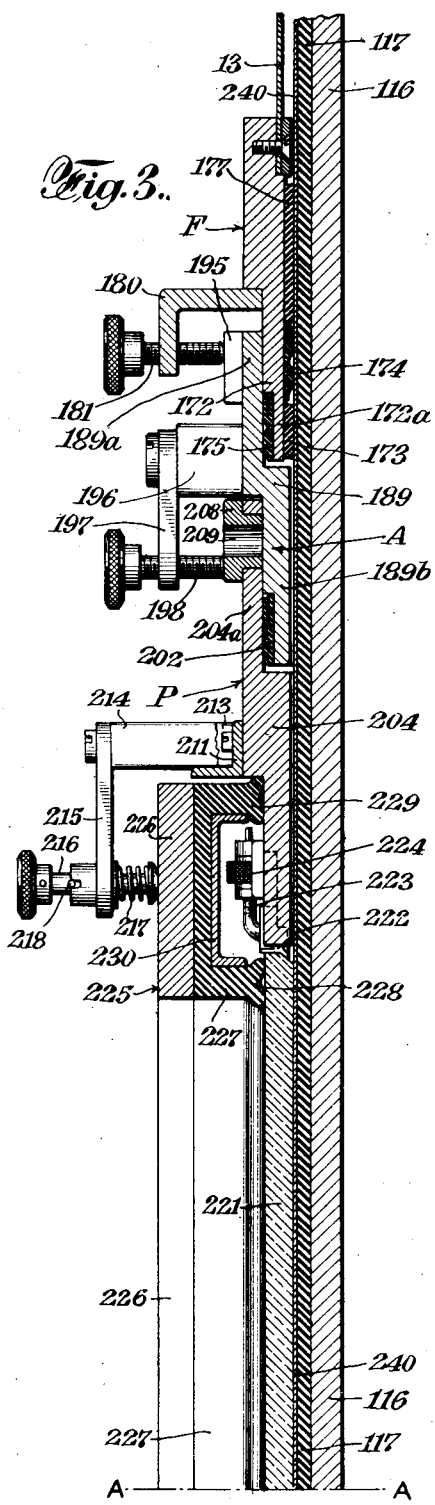
Fig. 3 is an enlarged, vertical sectional view, with parts omitted and partly in elevation, this view being taken on the upper part of the line 3—3 of Fig. 1 looking in the direction of the arrows.
Figure 3B:
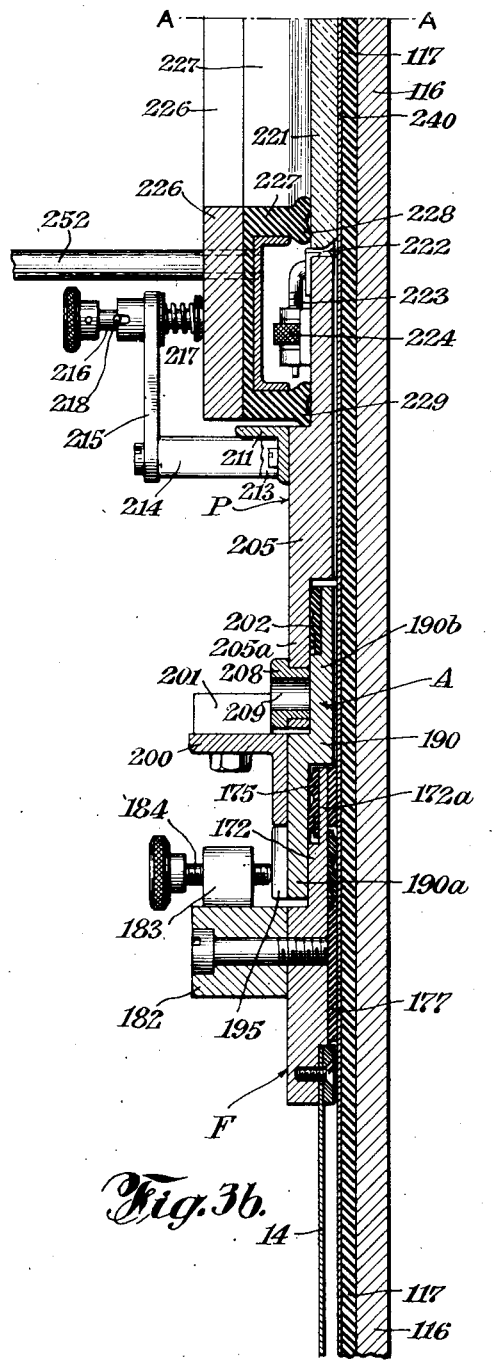
Fig. 3b is an enlarged, vertical sectional view, with parts omitted and partly in elevation, this view being taken on the lower part of the line 3—3 of Fig. 1 looking in the direction of the arrows, Figs. 3 and 3b being combinable on the line A—A.

Referring to Figs. 3, 3a, 5, 5a and 6, each of the vertical sides of the supporting frame F terminates in an inner section 171 of reduced thickness, Fig. 5, and, further, each horizontal side of said supporting frame F terminates in an inner section 172 likewise of reduced thickness, Fig. 3, these four sections defining the aforesaid rectangular opening of the supporting frame F. The frame sections 171, 172, on the side thereof toward the rear of the machine, have secured thereto by suitable adhesive a pair of endless strips 173, 174, the strip 174 being a sealing strip and these strips conforming in configuration with the opening defined by the supporting frame F and formed from suitable soft rubber, the rubber strip 173 being at the inner edges of said frame sections and the rubber strip 174 being spaced from the edges of said frame sections.

As shown in Fig. 3, the thickness at the extreme inner edges of each horizontal frame section 172 is reduced still further as at 172a so as to form channels facing toward the front of the machine for the respective horizontal sections of an endless sealing strip 175 of soft rubber, the respective vertical sections of which are disposed adjacent the inner edges of the vertical frame sections 171 on the side thereof facing the front of the machine, all of said rubber sections being adhesively secured in position and the configuration of said sealing strip 175 conforming with that of the opening defined by the supporting frame F.

As illustrated in Figs. 3, 5 and 17, the supporting frame F, on the surface thereof toward the rear of the machine, has adhesively secured thereto a blanket 177 formed from fabric embedded in rubber, this blanket 177 being apertured as at 177a and the surface defining said opening being disposed closely adjacent the endless sealing strips 174, Figs. 3 and 5. As clearly appears from Fig. 5, the outer vertical sides of the blanket 177 extend outwardly beyond the supporting frame F, as at 177b, and engage, in freely slidable manner, the flanged sections 178a of the respective rubber strips 178 which are adhesively secured in fixed position to metal strip members 179, respectively, the latter being fixed to the rear surfaces of the respective vertical track members 7.

In accordance with the invention, the supporting frame F is adapted to directly support a printing plate holder. Alternately, said supporting frame F supports an adapter frame and the latter, in turn, supports the printing plate holder. To this end, the side of the supporting frame F toward the front of the machine has the upper angle iron 180 secured thereto in horizontal position, this angle iron 180 supporting a plurality of spaced clamping screws 181, Fig. 1. The supporting frame F also has the lower bar 182 horizontally secured thereto, this bar having a plurality of spaced lugs 183 upstanding therefrom and each lug having a clamping screw 184 threaded therethrough, Fig. 3.

As indicated in Fig. 5, each vertical frame section 171, on the face thereof toward the front of the machine and midway of the ends thereof, has a fixed dowel pin 185 projecting laterally therefrom. Furthermore, each vertical side of the supporting frame F, immediately adjacent the associated dowel pin 185, carries a fixed support 186 which extends toward the front of the machine and has pivoted thereto a lever 187 which carries a clamping screw 188.

In Figs. 3 and 5, I have illustrated an adapter frame A as operatively associated with the supporting frame F. This adapter frame has upper and lower horizontal sides 189 and 190, Fig. 3, and spaced vertical sides 191 and 192, Fig. 5, the inner edges of these adapter frame sides forming a rectangular opening for the reception of the printing plate holder as hereinafter described.

As shown in Fig. 3, the thickness of the upper section of the upper adapter frame side 189, and the thickness of the lower section of the lower adapter frame side 190 are decreased as indicated respectively at 189a and 190a so as to provide space for the reception of the respective sections 172 of the supporting frame F. Likewise, as shown in Fig. 5, the thickness of the outer sections of the respective adapter frame vertical sides 191 and 192 is decreased as indicated at 191a and 192a, Fig. 5, so as to provide space for the reception of the respective sections 171 of the supporting frame F.

As illustrated, the adapter frame A has an exterior configuration of such character that it is snugly received in the aforesaid rectangular opening of the supporting frame F. As shown in Fig. 5, the vertical sides 191, 192 of the adapter frame A, midway of the ends thereof, are provided with the respective dowel holes 194, these holes being so positioned that they aline with and receive the dowel pins 185, respectively, of the supporting frame F when said adapter frame A is properly positioned in and on the supporting frame F. When the adapter frame A is in operative position on said supporting frame F, the upper end thereof is disposed within the space defined by the angle iron 180 and the lower end thereof is immediately adjacent the lower bar 182 and interiorly of the lugs 183. The exterior surface of the adapter frame A is provided with small bearing plates 195 which come into alined position with respect to the various clamping screws 181, 184, 188, respectively, when said adapter frame A is associated with the supporting frame F. Accordingly, when the screws last noted are rotated so as to move tightly against the respective bearing plates 195, it results that the adapter frame A is firmly and securely retained in operative position as shown on the drawings.

Extending laterally toward the front of the machine from the upper horizontal side 189 and the vertical sides 191, 192 of the adapter frame A, Figs. 3 and 5, are a plurality of spaced lugs 196 each of which carries a pivoted lever 197 and each lever 197 having a clamping screw 198 threaded therethrough, this arrangement being utilizable for holding the printing plate holder or frame in position in the manner hereinafter described. As clearly appears from a consideration of Fig. 1, each of the vertical sides 191, 192 of the adapter frame A preferably carries a handle 199, these handles being utilizable when said adapter frame is to be manually carried from place to place. Further, as shown in Figs. 1 and 3, the lower adapter frame side 190 has an angle iron 200 horizontally secured thereto, the upper surface of said angle iron 200 supporting a plurality of fixed blocks 201 which are spaced from the adjacent surface of said adapter frame side 190.

In further explanation of the adapter frame A, reference is to be had to Fig. 3 wherein the thickness of the inner or lower section of the upper adapter frame side 189, and the thickness of the inner or upper section of the lower adapter frame side 190 are shown as decreased as indicated, respectively, at 189b and 190b. Likewise, as shown in Fig. 5, the thickness of the inner sections of the respective adapter frame vertical sides 191 and 192 is decreased as indicated at 191b and 192b. Still further, as illustrated, said inner vertical sections 191b and 192b of the adapter frame A, on the side thereof toward the front of the machine, have the respective vertical sections of the endless soft rubber sealing strip 202 adhesively secured thereto, the respective horizontal sections of said sealing strip 202 being adhesively secured in channeled sections of the horizontal sections 189b and 190b of said adapter frame A on the side thereof toward the front of the machine.

In addition to the foregoing, as shown in Fig. 5, the inner vertical sections 191b, 192b of the adapter frame F, preferably midway between the ends thereof, have the respective dowel pins 203 secured thereto and projecting laterally therefrom, these pins being utilizable in connection with the positioning of the printing plate holder as hereinafter described.

As illustrated in Figs. 1, 3, 5, 21 and 22, I have shown a printing plate holder P having upper and lower horizontal sides 204 and 205 together with spaced vertical sides 206 and 207, the inner surfaces of said horizontal and vertical sides defining a rectangular opening for the reception of the printing plate as hereinafter more fully described.

As shown in Fig. 3, the thickness of the upper or outer section of the upper printing plate holder side 204 and the thickness of the lower or outer section of the lower printing plate holder side 205 are decreased as indicated at 204a and 205a, respectively, so as to provide space for the reception of the respective sections 189b and 190b of the adapter frame A. Likewise, as shown in Fig. 5, the thickness of the outer sections of the respective printing plate holder vertical sides 206 and 207 is decreased as indicated at 206a and 207a, Fig. 5, so as to provide space for the reception of the respective sections 191b and 192b of said adapter frame A.

As shown in Figs. 21 and 22, the surface of the printing plate holder P which is adapted to be positioned toward the front of the machine has a plurality of spaced plates 208 secured thereto, these plates being positioned at the corners of said plate holder P and to each side thereof midway between the ends thereof.

In order to associate the printing plate holder P with the adapter frame A, the lower side of said plate holder P is first disposed behind the blocks 201, Fig. 3, and then moved into snug, close-fitting relationship with respect to said adapter frame A. As shown in Fig. 21, each of the horizontal and vertical sides 204, 205, 206 and 207 of the adapter frame A are provided with the dowel holes 209, respectively, these dowel holes being so located that those on opposite respective sides of said printing plate holder aline with and receive the respective dowel pins 203 of the adapter frame A when said printing plate holder is properly positioned in and on said adapter frame A. After the printing plate holder P is thus seated on the adapter frame, the various adapter frame levers 197 are swung to the respective positions thereof shown in Fig. 1 whereupon the screws 198 are tightened to thereby hold the plate holder sections 204a, 205a, 206a and 207a in sealing engagement with the respective sealing strips 202.

As shown in Fig. 21, the printing plate holder P carries a pair of spaced vertical angle irons 210 and a pair of spaced horizontal angle irons 211, all of these angle irons being secured to the printing plate holder P by screws 212 and, as shown in Fig. 21, each of the horizontal angle irons 211, midway between the ends thereof, carrying a handle 213, these handles being utilizable as hereinafter described for the purpose of handling the printing plate holder.

As shown in Figs. 21 and 22, each horizontal angle iron 211, immediately adjacent the respective ends thereof, carries a laterally projecting block 214 to each of which an arm 215 is pivoted, each arm having a member 216 readily slidable therein, each member 216 being biased from left to right, Fig. 22, by a spring 217, and said member 216 carrying pins 218 coactable with the respective slots 219 formed in the arm 215.

As shown in Figs. 21 and 22, the printing plate holder P is provided with a central rectangular oblong opening 220 within which is received the printing plate 221 which may be either a photographic positive or a negative, said plate 221 being herein illustrated as a transparent glass plate which, as shown in Fig. 1, exhibits a design or representation, the likeness of which is to be reproduced on the sensitized surface supported by the backboard of the photo-composing machine. The printing plate 221 is suitably maintained in proper adjusted position in the aforesaid opening 220 of the printing plate holder P and the arrangement for accomplishing this purpose may be of any suitable character as well known in the art. Thus, to this end, there may be utilized a pluraltiy of faced clamping plates 222 which engage the edges of said printing plate 221, movement of these clamping plates 222 being controlled by threaded spindles 223 operated, respectively, by nuts 224 positioned in suitable manner so as to be movable only in a rotatable direction.

For the purpose of sealing the opening between the printing plate 221 and the printing plate holder, I provide a sealing frame 225, Figs. 3 and 5, which is of rectangular oblong configuration corresponding with but somewhat larger than the shape of said printing plate 221, said sealing frame having the handles 225a associated therewith. As clearly indicated in Fig. 1, the sealing frame 225 comprises four frame members 226, adjacent ends of each pair of which are connected by a joint and these joints permitting the frame members 226 to move with respect to each other, all as well known in the photo-composing machine art. The frame members 226 form a supporting frame to which is secured a continuous channel-shaped rubber sealing member 227 of rectangular oblong configuration, said sealing member having a first lateral flange 228 which engages the adjacent surface of the printing plate 221, and said sealing member 137 having a second lateral flange 229 which engages the adjacent surface of the printing plate holder whereby the space between the edges of the printing plate 221 and the printing plate holder are bridged to thereby seal this opening and prevent the passage of air therethrough. Preferably, channel-shaped members 230, of slightly less length than the respective frame members 226, are fitted into and secured to the channel-shaped sealing member 227. With an arrangement of the character described, space is provided between the flanges 228 and 229 for the reception of the above described adjusting arrangements for the printing plate 221, Fig. 3. By virtue of the provision of the above described plates for the frame members 226, the sealing frame 225 is flexible at its corners so that it may adjust itself to any irregularities in the surface container or thickness of the printing plate 221.

The hereinbefore described sets of angle irons 210 and 211 serve as a pocket in which the sealing frame 225 is received. Further, the above described pivot arms 215 and associated members 216 serve, in an obvious manner, as an arrangement for holding the sealing frame 225 in its intended operative position as shown in Figs. 3 and 5. Furthermore, the pressure exerted by the springs 217 cause the sealing strip flanges 228 and 229 to be held in close engagement with the respective surfaces which are coactable therewith to thereby produce a sealed chamber interiorly of the channel-shaped member 225.

With each machine of the character herein described, a plurality of the printing plate holders P are provided, these holders having the same exterior dimensions but having different interior dimensions adapting them to receive printing plates 221 of different sizes. Therefore, for the particular printing plate 221 from which images are to be projected onto the sensitized surface, a plate holder P is chosen which has the proper dimensions for said printing plate. Thereupon, in a manner familiar to those skilled in the art, the position of said printing plate 221 in the printing plate holder P is adjusted as desired whereupon the printing plate is secured in fixed position by manipulation of the adjusting nuts 224. At this time, the sealing frame 225 is placed in operative position as shown on the drawings and then the members 216 are moved to clamping position as illustrated in Figs. 3 and 5 whereby said sealing frame is positively retained in its operative position to establish a sealed joint between the printing plate 221 and its holder P.

Assuming that the supporting frame F is empty, the operator selects an adapter frame A having the proper interior dimensions for the reception of the printing plate holder P noted immediately above. This adapter frame A is grasped by the handles 199 and associated with the supporting frame F in the manner hereinbefore described with the adapter frame dowel holes 194 receiving the respective dowel pins 195 of the supporting frame A. Then, the clamping screws 181, 184 and 188 are threaded to their respective clamping positions to thereby positively secure the adapter frame A in its intended position and to compress the sealing ring 175 whereby a sealed joint is produced at the junction of the supporting frame F and the adapter frame A.

At this stage of the operation, the operator grasps the handles 213 of the printing plate holder P and, while holding the desired side thereof uppermost, elevates the same, registers the dowel holes 209 at the respective vertical sides thereof with the dowel pins 203, respectively, of the adapter frame A, and then seats said plate holder P in operative position on said adapter frame A. Due to the provision of one dowel hole 209 in each side of the printing plate holder, it results that said printing plate holder may be placed in the adapter frame A in any 90 degree position, i. e., with any side 204, 205, 206, 207 thereof uppermost.

Thereupon, the various clamping screws 198 are threaded to their respective clamping positions whereby the plate holder P is securely fastened to the adapter frame A and the sealing ring 202 is compressed to produce a sealed joint between the plate holder P and the adapter frame A.

At this stage of the operation, the backboard B should be in its horizontal position so that a suitable light-sensitive or sensitized surface or member 240, such as a zinc plate, may be secured to the upper surface 117 thereof in suitable manner, as by the use of the usual adhesive tape. Thereupon, the backboard B should be elevated by manual action to its vertical position, the springs 127 assisting in this action. When in vertical position, the handle 108a is actuated, Fig. 9, to thereby cause outward movement of the rods 111 whereby they enter the respective socket members 141 to positively secure the upper end of the backboard B to the respective vertical members 122, the lower end of said backboard B already being positively retained to said vertical members 122 by the respective axle members 119 and 120. Upon completion of the foregoing, the backboard B is in vertical position with the sensitized surface 240 thereof facing the adjacent vertically disposed printing plate 221 and spaced therefrom.

At this time, the printing plate 221 is adjusted as regards height to cause it to take the position which it is to occupy during the first printing operation. To this end, if the printing plate holder P is to be raised, the switch button 241, Fig. 1, is depressed whereby the motor M rotates in one direction. If said printing plate holder is to be lowered, the switch button 242 is depressed to cause the motor M to rotate in the opposite direction. In either instance, rotation of said motor M is discontinued by depression of the switch button 243 and, in addition, the motor M is controlled by the upper and lower limit switches 244 and 245. As will readily be understood, final adjustment may be imparted to the plate holder P by manually rotating the hand wheel 44 in one direction or the other. In connection with such vertical adjustment imparted to the printing plate holder, the counter mechanism 59d and the micrometer disk 33 indicates the extent to which the plate holder P has moved from a predetermined index.

As will readily be understood, in view of the description hereinbefore given, operation of the motor M effects rotation of the shaft 37 whereby the jack screws 9 are rotated in the same direction and at the same speed by the respective trains of gears 32a, 27a, 26a, 25a, 9a and 32a, 28a, 29a, 30a and 9a. The hand wheel 44 is also connected to this shaft 37 and, therefore, rotation of said hand wheel 44 imparts movement to the plate holder P.

After the plate holder P has been adjusted in the manner described, the backboard B is moved horizontally in one direction or the other along the track 60 to position a selected area thereof opposite the printing plate 221. To this end, if the backboard B is to be moved to the right as viewed from the front of the machine, the switch button 246 is depressed to cause the motor M1 to rotate in such direction that the desired movement is imparted to said backboard B. If, on the other hand, the backboard B is to be moved toward the left, when viewed from the front of the machine, the switch button 247 is depressed to cause the motor M1 to rotate in the opposite direction and thereby produce the desired movement of said backboard B. In either instance, rotation of the motor M1 is discontinued by depression of the switch button 248. As will readily be understood, final adjustment may be imparted to the backboard B by manually rotating the hand wheel 94 in one direction or the other.

In view of the previous description, it will be understood that operation of the motor M1 produces rotation of the shaft 77 and that this shaft, through the chain of mechanism disclosed in Fig. 7, effects rotation of the shafts 70 and 71. Rotation of the shaft last named causes the backboard B to move horizontally in one direction or the other depending upon the direction in which the motor M1 is rotated. From a consideration of Fig. 13, it will be obvious that rotation of the shaft 77 may also be effected by the hand wheel 94 whereby accurate positioning of said backboard B may more readily be obtained than by manipulation of the various switch buttons 246, 247, 248. In connection with the movement of the backboard B as described above, it will be understood that the counting mechanism 87 and the micrometer wheel 95 are indicative of the extent to which said backboard B has been moved from some specified index.

The backboard B, of course, is in its rearward position during adjustment thereof as just described. In order to move said backboard B toward the front of the machine or into printing position where it is in contact with the printing plate 221, the switch button 249, Fig. 1, is depressed to thereby close the circuit of the motor M2. Conversely, when the backboard B is to be moved toward the rear of the machine or into non-printing position, the switch button 250 is depressed to thereby operate the motor M2 in a direction opposite to the operation effected by depression of the button 250.

As shown in Fig. 2, the backboard B is in its front or printing position and, to move said backboard B into non-printing position, the switch button 250 is depressed as stated immediately above. In response to this operation of the switch 250, the disk 154 moves the disk 153 from the position thereof shown in Fig. 14 to the position shown in Fig. 15 and, accordingly, the shaft 151 has a step of rotative movement imparted thereto in a counter-clockwise direction, Fig. 2.

In response to such counter-clockwise movement of the shaft 151, the arms 150 and link arrangements 149 cause the levers 143 to move in a clockwise direction, Fig. 2, whereby the two strap members 145 together with the pivot pins 144 and 146 are caused to move toward the rear of the machine. Each vertical member 122 has a set of the pivot pins 144 and 146 cooperative therewith at the respective slots 122a, 122b and, therefore, in response to such movement of the levers 143, the vertical members 122, while remaining vertical, move in unison toward the rear of the machine.

A vertical member 122 is disposed at each side of the backboard B. The lower ends of these members 122 have the respective axle members 119, 120 permanently secured thereto. The upper ends of said members 122 have the respective rods 111 associated therewith when the backboard B is in its vertical position. Therefore, when the vertical members 122 are moved in unison toward the rear of the machine, it necessarily follows that the backboard B is carried therewith, the plane of said backboard remaining vertical during such movement.

When the backboard B is in non-printing position and it becomes necessary to move the same to printing position, the shaft 121 is given a step of rotative movement in a clockwise direction, Fig. 2, by depression of the switch button 249. As will readily be understood, the mechanism operates in a sense the reverse of that described above when the backboard B is moved from non-printing to printing position.

With the backboard B in printing position, the sealing ring 174 is under compression and, therefore, a sealed chamber exists which is bounded on one side by the sealed-off area of the sensitized surface 240 and in part on the other side by the printing plate 221. At this time, the open end of a rubber tube 251 is associated with a rigid tube 252, Fig. 3, communicating with the interior of the sealing frame 225, this tube 251 being connected to a pipe 253, Fig. 1, having therein a control valve 254, said pipe 253 having an air pressure gauge 255 associated therewith and said pipe leading to any suitable air exhausting pump, not shown. As will readily be understood by those skilled in the art, operation of the handle 256 of the valve 254 effects withdrawal of air from the aforesaid sealed chamber whereby the printing plate and the adjacent section of the sensitized surface are brought into intimate contact suitable for printing purposes. The rear surface of each printing plate holder P and each adapter frame A is provided with shallow grooves 257 to facilitate the withdrawal of air from between the printing plate and said sensitized surface, Fig. 17.

After the arrangement has been placed in printing condition as just described, a light beam from a suitable light source, not shown, is passed, for a predetermined period, from the front of the machine toward the rear thereof, such light beam passing through the printing plate 221 and engaging the sensitized surface 240. Upon completion of this illuminating operation, by operation of the various controlling devices hereinbefore described, the vacuum is released, the backboard B is moved to its non-printing position, the printing plate and sensitized surface are alined in the next printing position, and then finally brought into close printing position as will readily be understood in view of the description hereinbefore given.

In accordance with the invention as herein disclosed, a lamp 264, preferably of significant coloring is mounted on the front of the machine, Fig. 1. This lamp may be energized and deenergized, if desired, in suitable manner to indicate desired positions of the backboard B.

As regards movement of the backboard B horizontally along the track 60, suitable limit switch mechanism 260 and 261 is shown in part in Figs. 7 and 9, this mechanism serving to prevent the operator from unintentionally moving said backboard beyond its normal range of movement.

An important aspect of the present invention has reference to use of an adapter frame A which is supported by the frame F and, in turn, supports the printing plate holder P. It shall be understood, however, that my invention is not to be thus limited. Thus, with printing plates 221 of large size, a printing plate holder may be selected which has exterior dimensions the same as the exterior dimensions of the adapter frames, i. e., such dimensions as correspond with the interior dimensions of the supporting frame F. Then, as shown in Figs. 3a and 5a, such "large" printing plate holder may be associated directly with the supporting frame. With such an arrangement, it will be understood that one less seal is present than exists when an adapter frame is used.

Of importance in connection with the present invention is the cross-section of the various endless sealing strips 174, 175, 202. As stated, these strips are formed of relatively soft rubber and each of them should be relatively thin at the edges thereof as indicated at $r$, $r$, Fig. 6, said sealing strip, between its edges, comprising a thickened rib $r1$ and an angular lip $r2$. Experience has demonstrated that such an arrangement is highly desirable from a practical operating viewpoint.

The advantages of my invention are numerous and of importance. In this connection, it is to be noted that photo-composing machines of the character herein illustrated and described give great satisfaction when operated to produce multi-exposure printing plates. Such machines are relatively simple and are capable of high-speed operation by a single operator for the intended purpose.

More particularly, as shown in Fig. 17, it is pointed out that the sealing strip 174 carried by the rear surface of the supporting frame F seals off an area of the sensitized surface 240 which is substantially larger than the area of the printing plate, the sealed-off area, however, being substantially smaller, usually, than the entire area of the sensitized surface. Experience has demonstrated that the exposure of sensitized plates with a sealing arrangement of this character yields exposed plates or press plates which function subsequently in a very satisfactory manner. In this connection, it is important to note that a sealing-off arrangement of the character described prevents embossing of the sensitized surface such as has heretofore been caused by the sealing rings or strips of the prior art vacuum frame.

Further in connection with the foregoing, the use of an endless sealing strip such as the endless strip 174 held permanently in the supporting frame F and which contacts directly with the press plate or sensitized surface is believed to be new in the machine herein disclosed. With such an arrangement, it is unnecessary to provide a sealing strip on the printing plate holder for contact with the sensitized surface. A printing plate holder of this character is highly advantageous and desirable from the commercial viewpoint particularly because the usual sealing strip is absent and hence may not be damaged when said plate holder is laid down or carelessly handled.

Another important feature of the present invention relates to the central grouping of the counters and controls in one zone at the front of the machine. This, of course, is highly desirable. In this connection, the micrometer disk 33 for indicating rotation of the twin jack screws 9 together with the multi-gear-train and auxiliary features thereof as hereinbefore described are considered of distinct importance particularly because contributing in an important sense to the accuracy of adjustments of the printing plate.

Still further, the automatic electrical control arrangement whereby the backboard B is moved toward and from the printing plate together with the safety characteristics thereof are features of importance as regards the improved operation of machines of the character described.

In addition to the foregoing, it will be understood by those skilled in the art that the machine of the present invention is one which presents numerous other detailed features contributing to the production of an efficient, satisfactory and practical machine utilizable for photo-composing purposes.

Although the invention has been shown in connection with a photo-composing machine of the vertical type, it shall be understood that, as regards certain broad aspects, the invention is not to be limited to such a machine. Thus, for example, that phase of the invention relating to the sealing-off of an area of the sensitized surface substantially larger than the area of the printing plate but less than the entire area of said sensitized surface shall be understood as of general application and not limited to a machine of the vertical type.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a photo-composing machine, a supporting frame, a printing plate holder carried by said supporting frame and being detachable therefrom, means for detachably securing said printing plate holder to said supporting frame, said printing plate holder being adapted to have a printing plate secured thereto, a detachable structure forming a double seal at the space between said printing plate and said holder, means carried by said supporting frame for forming a seal between said supporting frame and said printing plate holder, and means carried by said supporting frame for forming a seal between said supporting frame and an adjacent sensitized surface, said printing plate holder when detached from said supporting frame being free from all of the described sealing means.

2. In a photo-composing machine, a supporting frame, an adapter frame carried thereby, a printing plate holder carried by said adapter frame, a printing plate in said holder, means forming a double seal at the space between said printing plate and said holder, means forming a seal between said adapter frame and said printing plate holder, means forming a seal between said supporting frame and said adapter frame, and means forming a seal between said supporting frame and a sensitized surface.

3. In a photo-composing machine, means for supporting a sensitized surface in printing position, a supporting frame disposed adjacent said sensitized surface, means adapted to form a seal between said supporting frame and said sensitized surface, the inner surface of said supporting frame defining a rectangular opening, an endless sealing strip disposed on the front face of the supporting frame adjacent the inner surface thereof, a second frame received in the rectangular opening of said supporting frame, said second frame defining an inner rectangular opening, said sealing strip being held under compression between said frames, a second endless sealing strip disposed on the front face of said second frame adjacent said rectangular opening, and a printing plate holder received in the rectangular opening of said second frame, said second sealing strip being held under compression between said second frame and said printing plate holder.

4. In a photo-composing machine, a supporting frame, an adapter frame carried thereby, a printing plate holder carried by said adapter frame, means forming a seal between said adapter frame and said printing plate holder, means forming a seal between said supporting frame and said adapter frame, and means forming a seal between said supporting frame and a sensitized surface.

5. In a photo-composing machine, a supporting frame, an adapter frame carried thereby, a printing plate holder carried by said adapter frame, a printing plate carried by said printing plate holder, means forming a seal between said printing plate and said printing plate holder, means forming a seal between said adapter frame and said printing plate holder, means forming a seal between said supporting frame and said adapter frame, and means forming a seal between said supporting frame and a sensitized surface.

6. In a photo-composing machine, a supporting frame, means for guiding said frame for movement in opposite directions while maintained parallel with respect to an adjacent sensitized surface, a printing plate holder detachably carried thereby, a printing plate carried by said printing plate holder, means forming a seal between said printing plate and said printing plate holder, said means comprising a detachable U-shaped rubber structure having one leg coacting with said printing plate and the other leg coacting with said printing plate holder, means carried by said supporting frame for forming a seal between said supporting frame and said printing plate holder, and means forming a seal between said supporting frame and a sensitized surface, said printing plate holder when detached from said supporting frame being free from all of the described sealing means.

7. In a photo-composing machine, a supporting frame, an adapter frame carried thereby, a printing plate holder carried by said adapter frame, a printing plate carried by said printing plate holder, means forming a seal between said printing plate and said printing plate holder, said means comprising a U-shaped rubber structure having one leg coacting with said printing plate and the other leg coacting with said printing plate holder, means forming a seal between said adapter frame and said printing plate holder, means forming a seal between said supporting frame and said adapter frame, and means forming a seal between said supporting frame and a sensitized surface.

8. In a photo-composing machine, a main frame, means for guiding said frame for movement in opposite directions while maintained parallel with respect to an adjacent sensitized surface, an endless sealing strip carried by said frame for engagement with said sensitized surface, a holder for a printing plate, means for detachably supporting said holder on said frame, a compressible member forming a seal between said printing plate and said holder, and a second compressible member forming a seal between said holder and said frame, said second compressible member being independent of and spaced from said compressible member, said frame remaining in the photo-composing machine in association with said guiding means when said holder is detached from said frame.

9. In a photo-composing machine, a main frame, means for guiding said frame for movement in opposite directions while maintained parallel with respect to an adjacent sensitized surface, an endless sealing strip carried by the side of said frame adjacent said sensitized surface and adapted to engage therewith, a second sealing strip carried by the opposite side of said frame, a holder for a printing plate, and means for detachably supporting said holder on said frame in engagement with said second sealing strip, said frame remaining in the photo-composing machine in association with said guiding means when said holder is detached from said frame and said holder when detached from said supporting frame being free from all of the described sealing strips.

10. In a photo-composing machine, a main frame, means for guiding said main frame for movement in opposite directions while maintained parallel with respect to an adjacent sensitized surface, an endless sealing strip carried by said main frame for engagement with said sensitized surface, an adapter frame, means forming a seal between said main frame and said adapter frame, a holder for a printing plate carried by said adapter frame, means forming a seal between said adapter frame and said holder, and means for detachably supporting said adapter frame on said main frame, said main frame remaining in the photo-composing machine in association with said guiding means when said adapter frame is detached from said main frame.

ALEXANDER T. KOPPE.

CERTIFICATE OF CORRECTION.

Patent No. 2,174,726.   October 3, 1939.

ALEXANDER T. KOPPE.

It is hereby certified that error appears in the printed specification of the above numbered patent requiring correction as follows: Page 6, second column, line 54, for "Alternately" read Alternatively; line 59, for "thereo" read thereto; line 73, for "aljacent" read adjacent; page 11, second column, line 71, claim 8, before the word "compressible" insert first named; and that the said Letters Patent should be read with this correction therein that the same may conform to the record of the case in the Patent Office.

Signed and sealed this 5th day of December, A. D. 1939.

(Seal)

Henry Van Arsdale,
Acting Commissioner of Patents.